US011879291B2

(12) United States Patent
Barioli et al.

(10) Patent No.: US 11,879,291 B2
(45) Date of Patent: Jan. 23, 2024

(54) BAHAMA/COLONIAL LOUVER SHUTTER

(71) Applicant: EASTERN METAL SUPPLY, INC., Lake Worth, FL (US)

(72) Inventors: Raffaele Barioli, Lake Worth, FL (US); Brian Peterson, Lake Worth, FL (US); Chris Miller, Lake Worth, FL (US)

(73) Assignee: Eastern Metal Supply, Inc., Lake Worth, FL (US)

( * ) Notice: Subject to any disclaimer, the term of this patent is extended or adjusted under 35 U.S.C. 154(b) by 123 days.

(21) Appl. No.: 17/489,192

(22) Filed: Sep. 29, 2021

(65) Prior Publication Data

US 2022/0098925 A1 Mar. 31, 2022

Related U.S. Application Data

(60) Provisional application No. 63/085,237, filed on Sep. 30, 2020.

(51) Int. Cl.

| | |
|---|---|
| ***E06B 7/086*** | (2006.01) |
| ***E06B 7/082*** | (2006.01) |
| *E06B 7/096* | (2006.01) |
| *E06B 9/00* | (2006.01) |
| *E06B 7/09* | (2006.01) |

(52) U.S. Cl.

CPC .............. *E06B 7/086* (2013.01); *E06B 7/082* (2013.01); *E06B 7/09* (2013.01); *E06B 7/096* (2013.01); *E06B 2009/005* (2013.01)

(58) Field of Classification Search

CPC ............... E06B 7/086; E06B 2009/005; E06B 2009/1583; E06B 7/082; E06B 9/0676

See application file for complete search history.

(56) References Cited

U.S. PATENT DOCUMENTS

| | | | | |
|---|---|---|---|---|
| 5,246,054 A * | 9/1993 | Shepherd | E06B 9/86 | 160/133 |
| 5,253,694 A * | 10/1993 | Bernardo | E06B 9/581 | 160/133 |
| 5,365,990 A * | 11/1994 | Ueda | E06B 9/15 | 160/133 |
| 2015/0368962 A1* | 12/2015 | Motosko | E04H 9/14 | 160/107 |

FOREIGN PATENT DOCUMENTS

| | | | |
|---|---|---|---|
| FR | 1580908 A * | 6/1968 | E06B 7/082 |
| FR | 2208041 A * | 7/1974 | E06B 7/082 |

* cited by examiner

*Primary Examiner* — Marcus Menezes

(74) *Attorney, Agent, or Firm* — Polsinelli PC

(57) ABSTRACT

A shutter is provided. First and second side rails have cavities running in a direction from top to bottom, each cavity having an opening along a lateral side. A plurality of pairs of slat supports are present, each pair having a slat support mounted in the cavity of the first rail and mounted in the cavity of the second rail. Each slat support has a first section and a second section. The first section has a shape to slide into one of the cavities, and to stack and nest with an adjacent first section of another slat support in the one of the cavities. The second section protrudes through the opening of the one of the cavities. A plurality of slats are present, each slat being mounted on the second sections of one of the pairs of slat supports.

13 Claims, 28 Drawing Sheets

Fig. 6
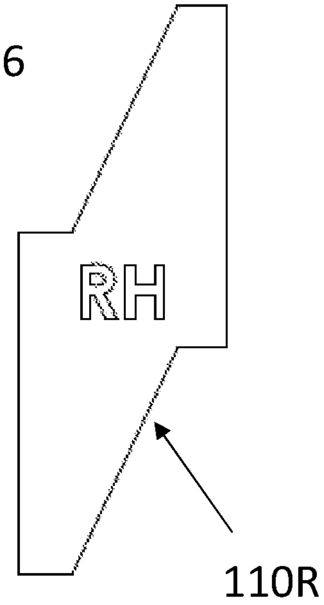
Fig. 7
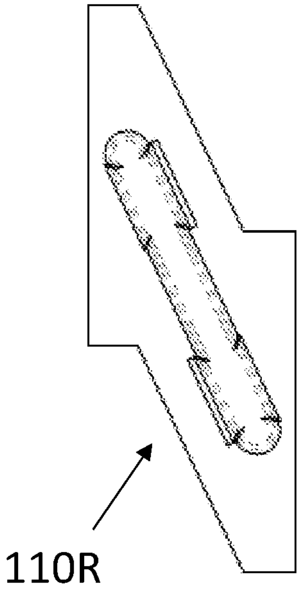
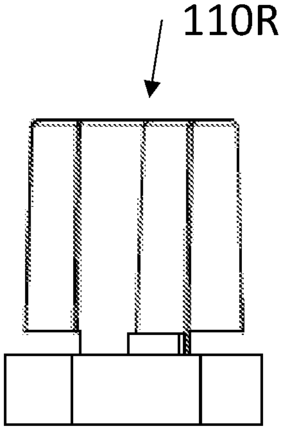
Fig. 8
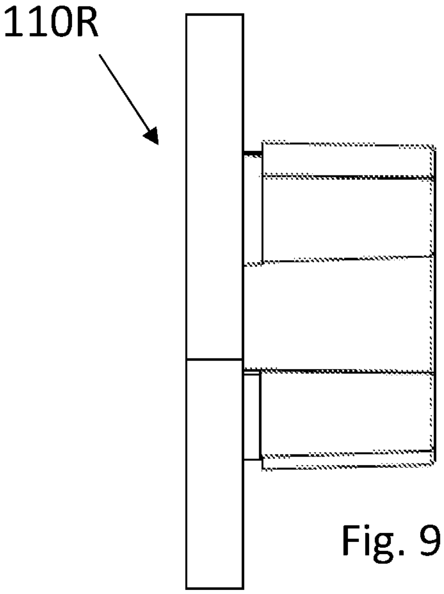
Fig. 9

Fig. 26
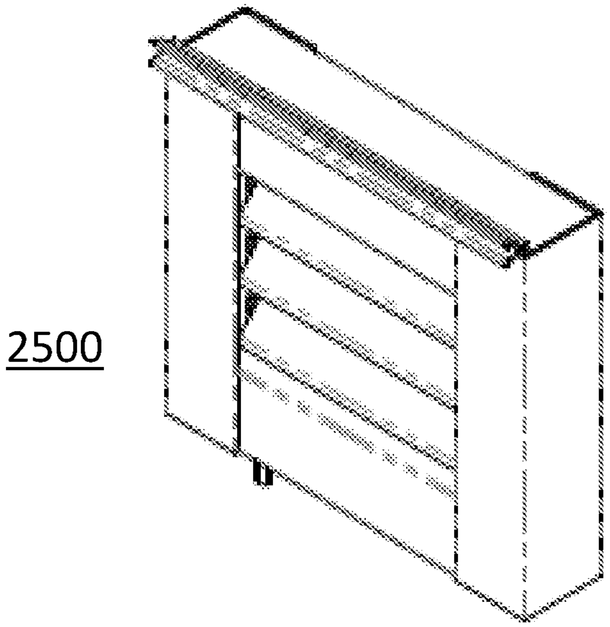
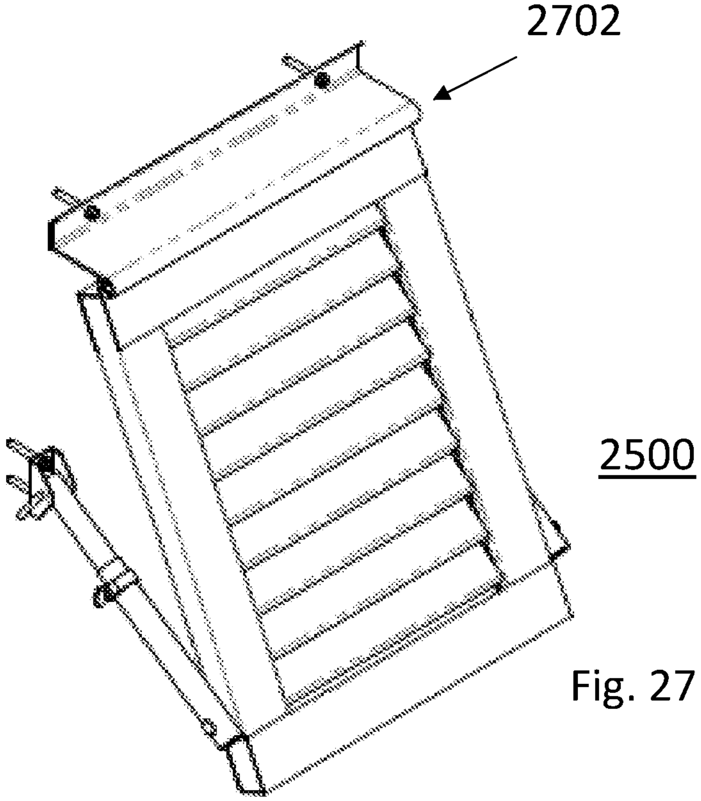
Fig. 27

Fig. 28
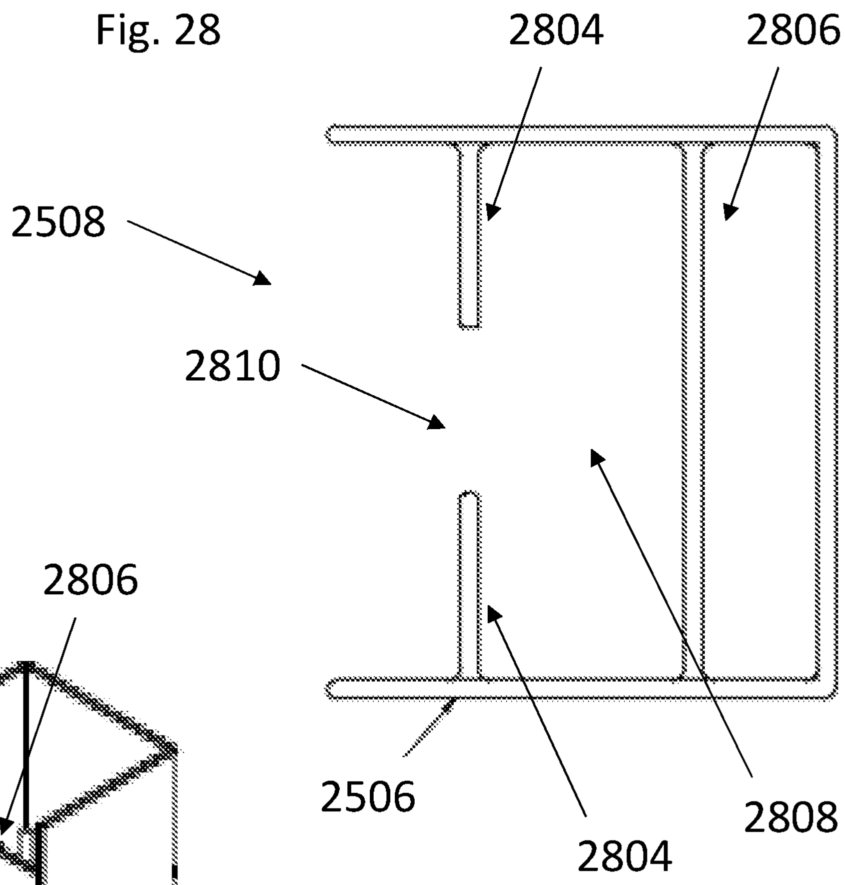
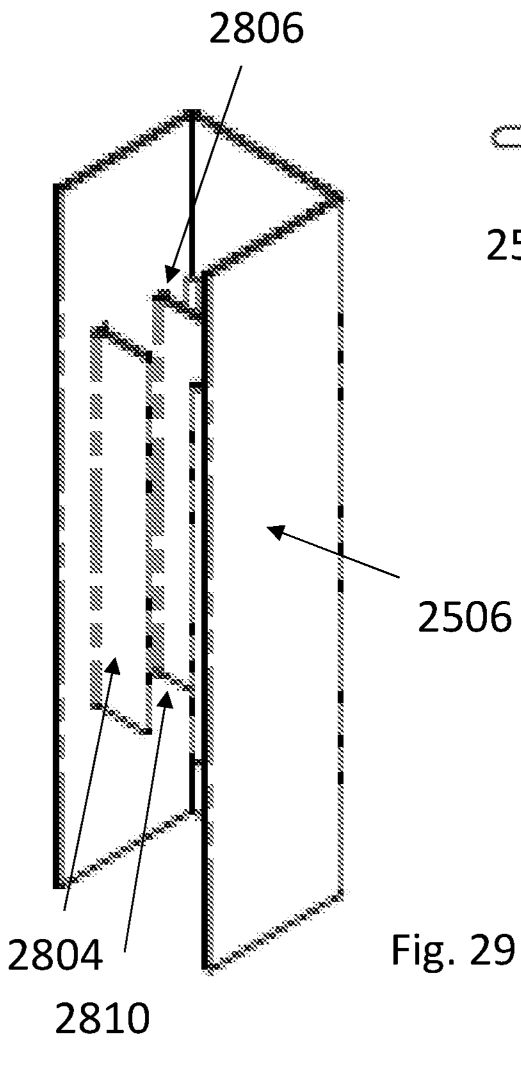
Fig. 29

Fig. 34A
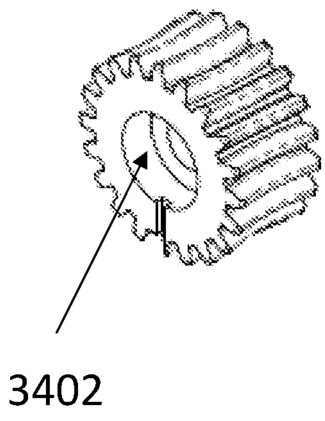
Fig. 34B
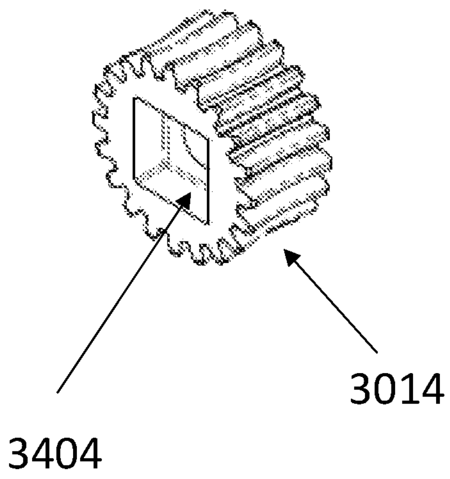
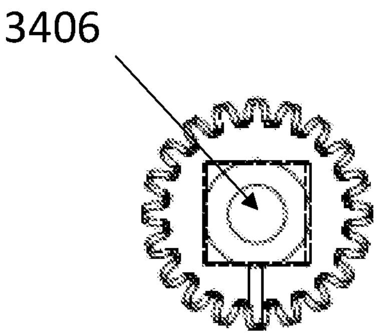
Fig. 34C

Fig. 35A
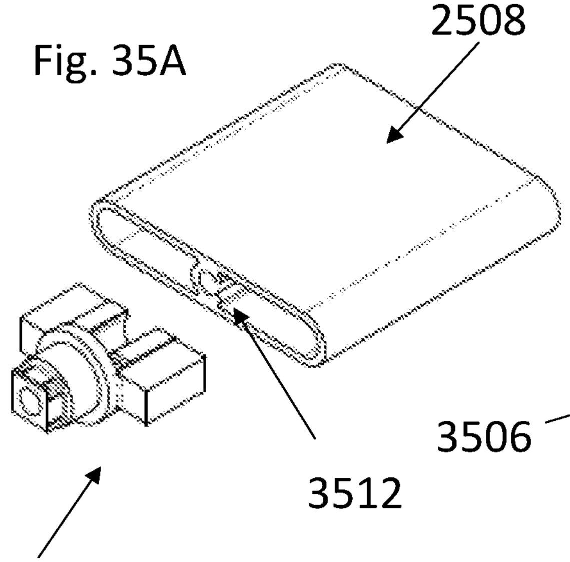
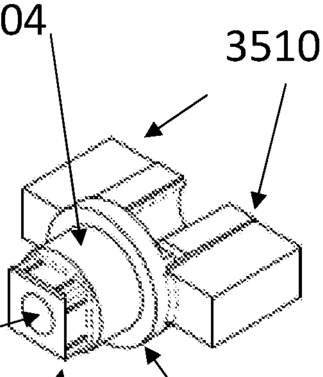
Fig. 35C
Fig. 35B
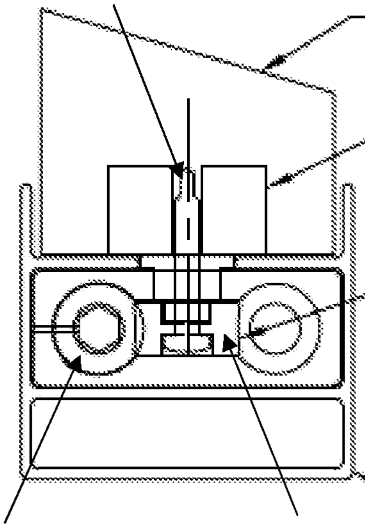
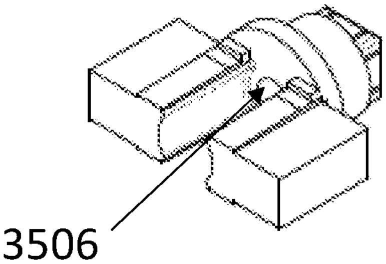
Fig. 35D

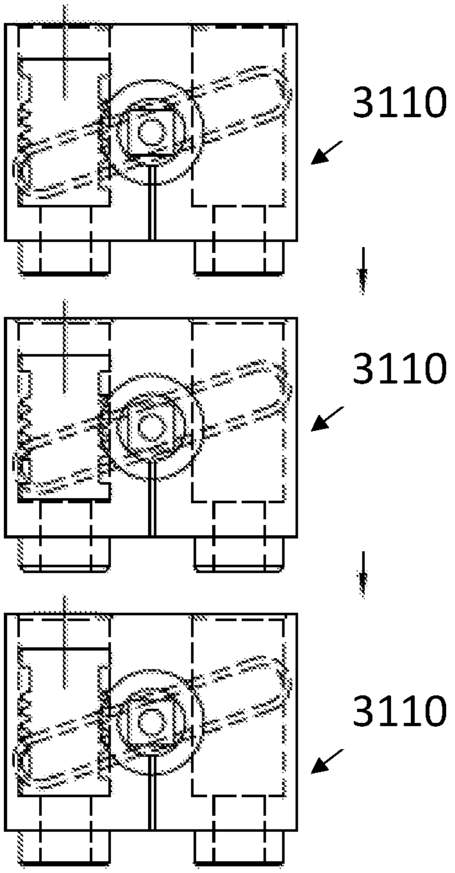
Fig. 39
Fig. 40
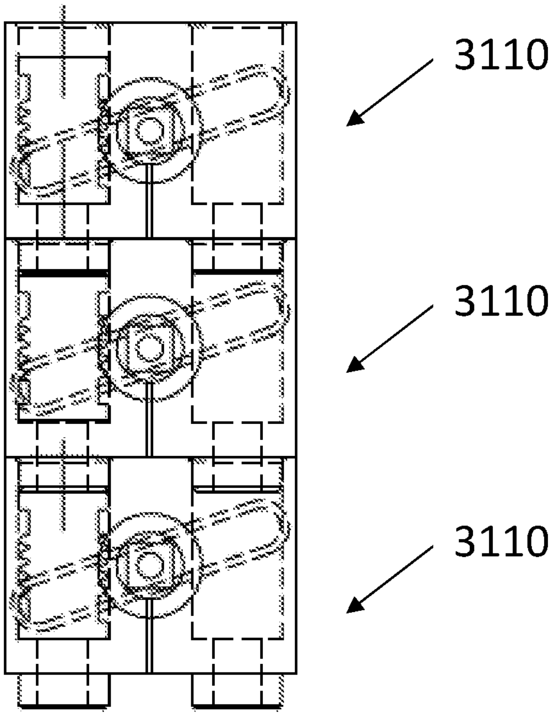

Fig. 42
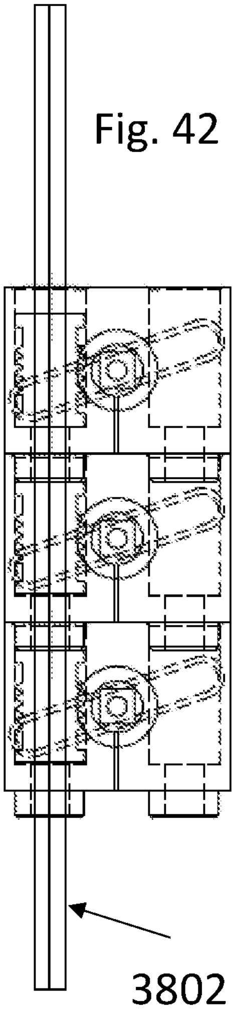
Fig. 43
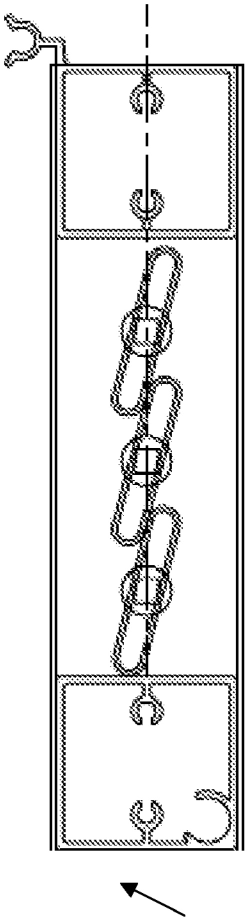
Fig. 44
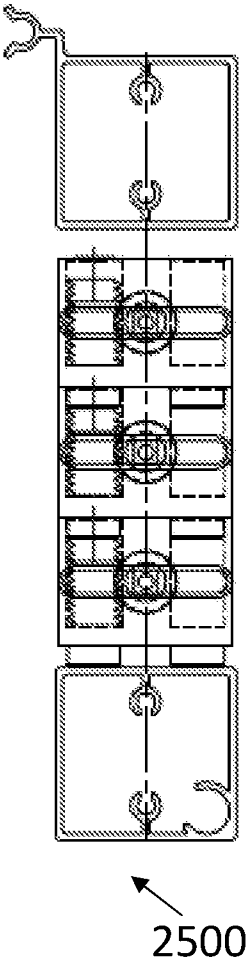
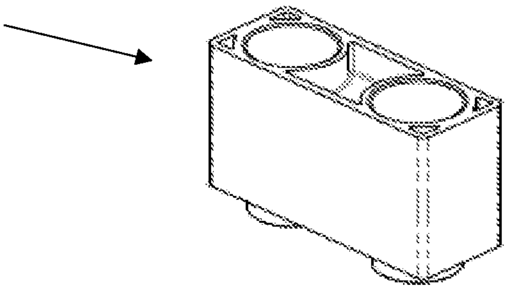
Fig. 45

BAHAMA/COLONIAL LOUVER SHUTTER

CROSS REFERENCE TO RELATED APPLICATIONS

The instant Application claims priority to U.S. Provisional Patent Application 63/085,237 entitled BAHAMA/COLONIAL LOUVER SHUTTER filed Sep. 30, 2020, the contents of which are expressly incorporated by reference herein in its entirety.

FIELD OF THE INVENTION

Various embodiments described herein relate generally to a Bahama style window shutter.

BACKGROUND

Shutters are used for decoration, security, and weather protection. Recent powerful hurricanes in the southeastern United States have raised building protection as a serious issue. Shutters are often used in these and other regions to provide protection during hurricanes and other strong storms. Shutters provide light and air during a storm, while protecting the building and the occupants from airborne objects. Many coastal portions of the United States require that homes and businesses have metal storm shutters over windows to protect the interior of the buildings during extreme weather which is common to this part of the country.

There are various different types of metal shutters on the market. However, most do not allow in light or air when deployed, creating claustrophobic conditions inside the building. Others need to be put up and taken down for every storm, which is a tedious process.

The Bahama shutter is a common type of shutters that is permanently attached to a building by a hinge at the top of the window opening, and their design allows some light and air to enter the building even when closed. However, these shutters were usually made of wood, which does not satisfy most building code requirements and is not strong enough to withstand hurricane winds. The wood components cannot simply be replaced with stronger materials such as metal, as the design would be too heavy and unstable in that configuration.

U.S. Pat. No. 8,365,468, incorporated herein by reference in its entirety, discloses a metal Bahama shutter that overcame the above drawbacks. The design utilizes left and right sides with diagonal slots that accommodated metal slats that extended laterally across the shutter.

The above design has a variety of manufacturing obstacles that increase the overall cost. The slots that receive the slats have to be milled to exacting standards, as if a slot is too small it would not accommodate the slat, and if the slot is too large the slat would be loosely held and rattle when moved. The slats need to be longer than the opening between the side rails to pass through the slots, which increases weight and material cost. It is also difficult to paint the shutter before assembly, and the individual components tend to scratch each other and mar previously applied paint; the shutter must therefore be assembled before painting, for which in the assembled state the shutter is difficult to manipulate due to its size and weight.

DRAWINGS

Various embodiments in accordance with the present disclosure will be described with reference to the drawings, in which:

FIGS. 5-9 show perspective, right side, left side, top and front views of a slat support according to an embodiment of the invention.

FIG. 26 shows a perspective view of an assembled state of the embodiment of FIG. 7.

FIG. 27 shows an embodiment of the assembled state of FIG. 26 mounted on a wall.

FIGS. 28 and 29 shows a top and perspective view of a side member of an embodiment of the invention.

FIGS. 34A-C are various views of a worm wheel gear according to an embodiment of the invention.

FIGS. 35A-D are various views of a slat insert relative to a slat and a side rail according to an embodiment of the invention.

Figures 36, 37:
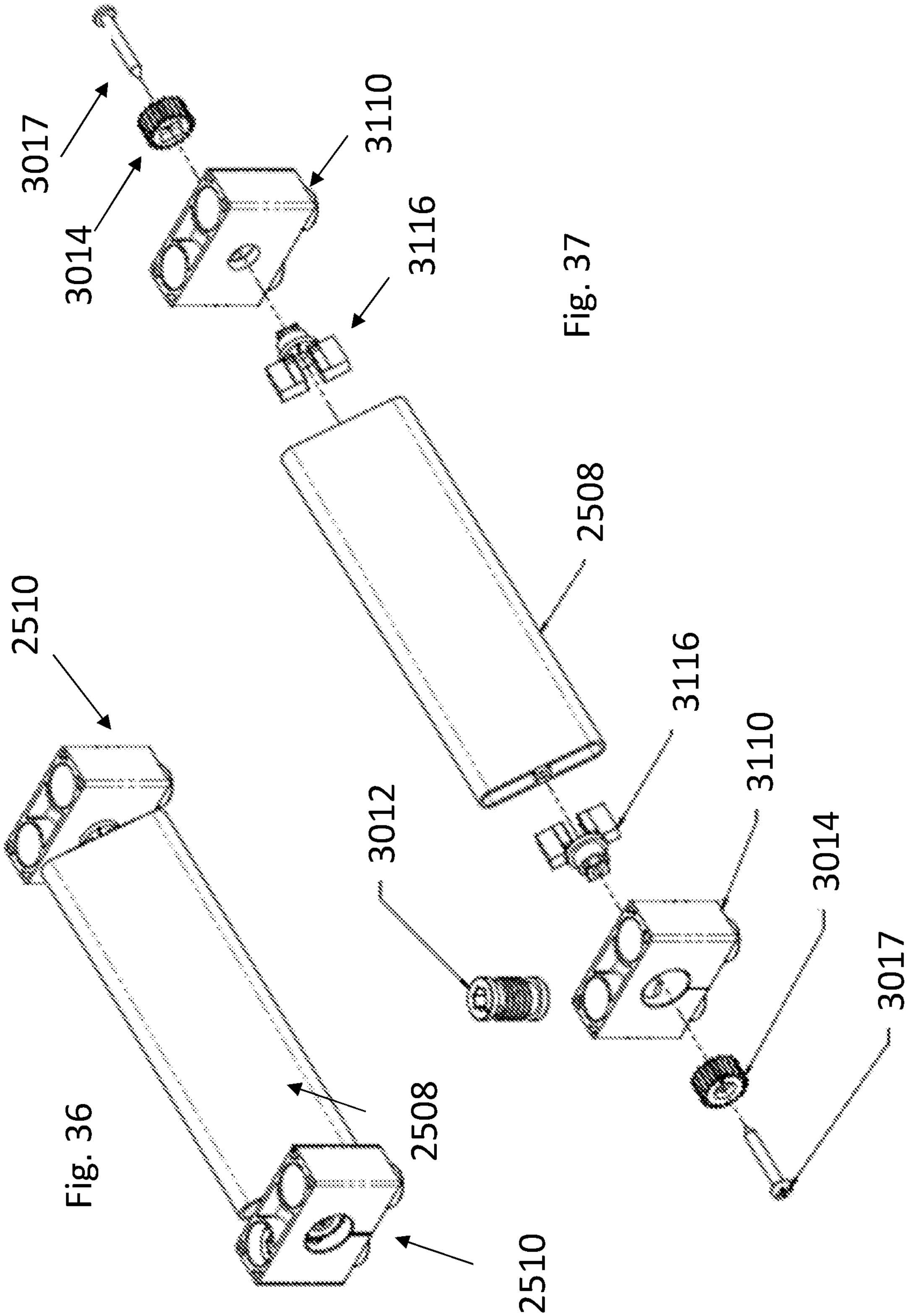

FIGS. 36 and 37 are assembled and exploded views of a slat with a pair of slat supports according to an embodiment of the invention.

Figure 38:
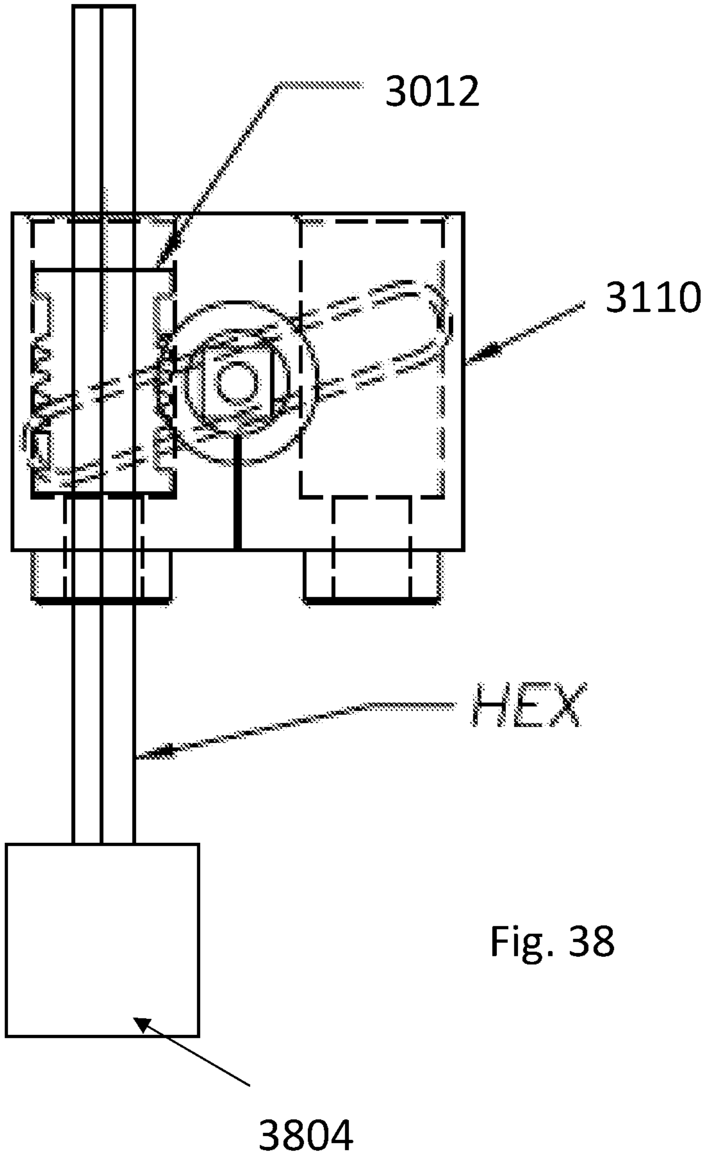

FIG. 38 is a transparent side view of a slat and slat support with a drive shaft according to an embodiment of the invention.

FIGS. 39 and 40 are transparent side views of slat supports and slats in states of nesting according to an embodiment of the invention.

Figure 41:
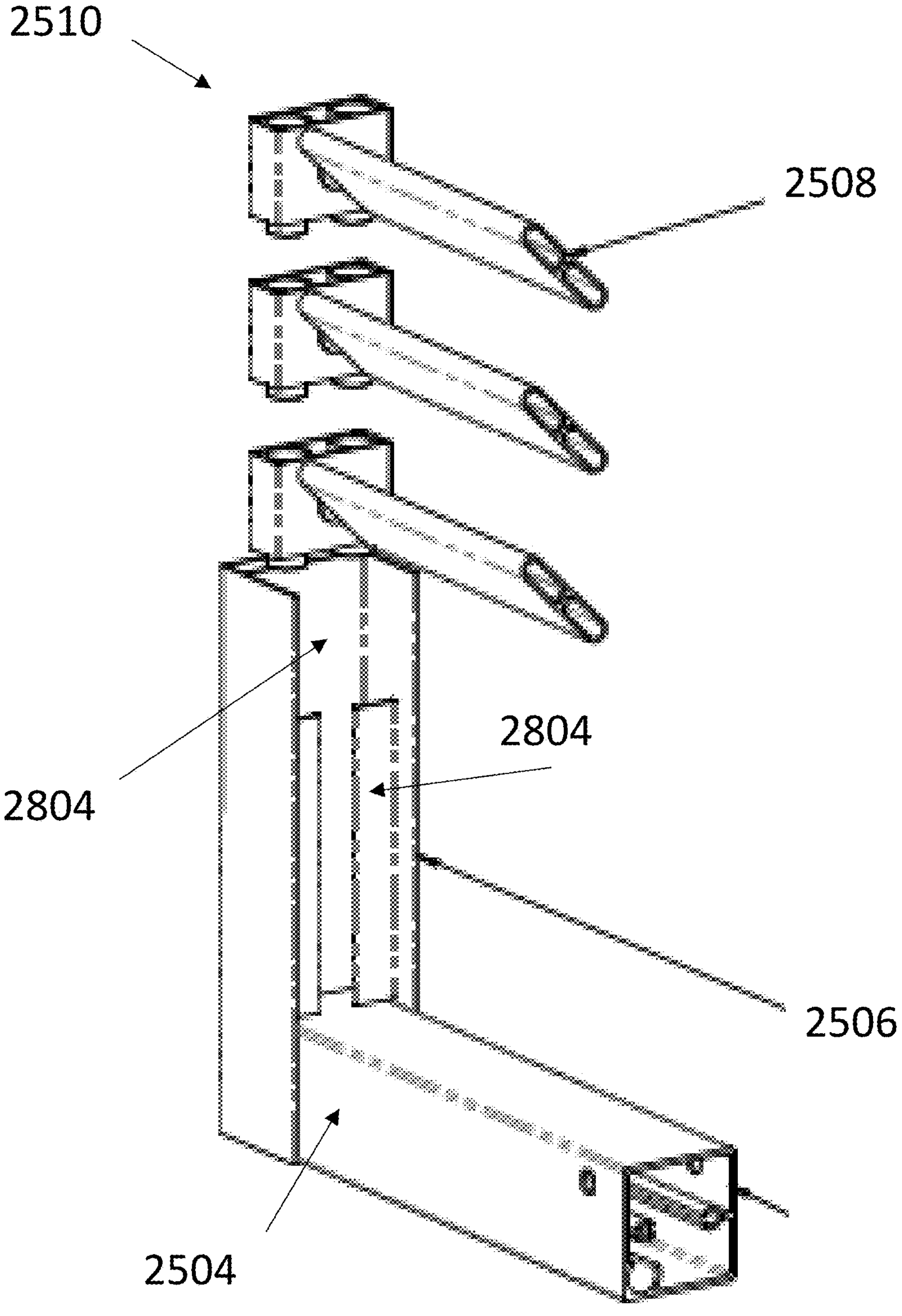

FIG. 41 is a perspective view of various components being assembled according to an embodiment of the invention FIGS. 42-44 are transparent side views showing various angles of slats relative to the shutter.

FIG. 45 is a perspective view of a spacer.

All drawings are to scale unless noted otherwise.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized means "including, but not necessarily limited to"; it specifically indicates open-ended inclusion or membership in the so-described combination, group, series and the like. The term "a" means "one or more" unless the context clearly indicates a single element. The term "about" when used in connection with a numerical value means a variation consistent with the range of error in equipment used to measure the values, for which ±5% may be expected. "First," "second," etc., are labels to distinguish components or blocks of otherwise similar names, but does not imply any sequence or numerical limitation. When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

Figure 1:
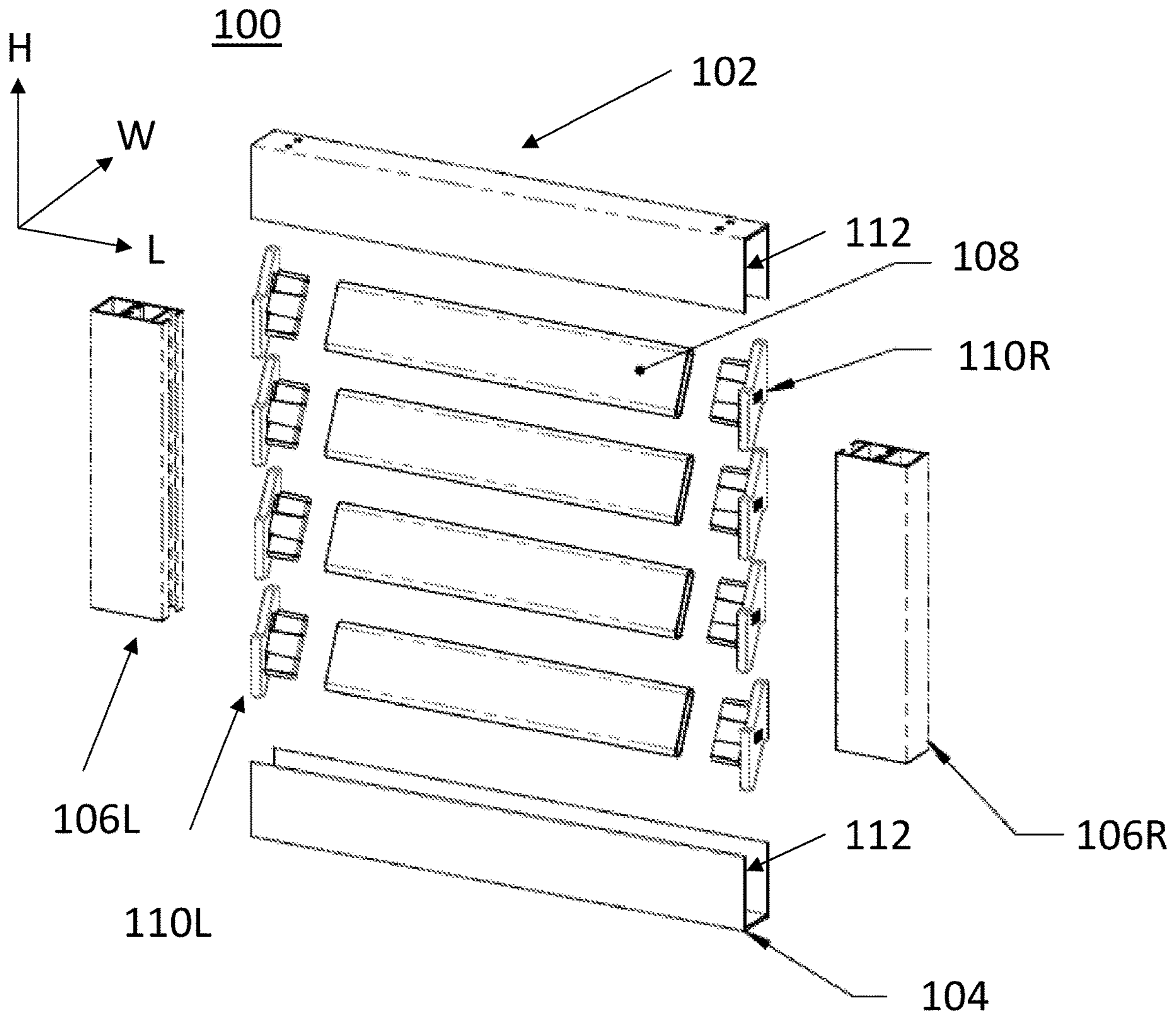
FIG. 1 shows an exploded view of an embodiment of the invention.

As used herein, the term "front", "rear", "left," "right," "top" and "bottom" or other terms of direction, orientation, and/or relative position are used for explanation and convenience to refer to certain features of this disclosure. However, these terms are not absolute, and should not be construed as limiting this disclosure. For purposes of discussion, as shown in FIG. 1 the dimension of "length" (L) shall be between the left and right sides of the shutter, the dimension of "width" (W) shall be between the front and back of the shutter, and the dimension of "height" (H) shall be between the top and bottom of the shutter.

"Stackable," "stack" or the like refers to a quality of components to be placed one on top of another.

"Nestable," "nesting" or the like refers to a quality of stackable identical objects that one object partially overlaps the other. By way of non-limiting example, cubes are stackable but not nestable, whereas LEGO bricks are stackable and nestable because the top of the LEGO brick overlaps with the bottom of an adjacent LEGO brick.

Shapes as described herein are not considered absolute. As is known in the art, surfaces often have waves, protrusions, holes, recesses, etc. to provide rigidity, strength and functionality. All recitations of shape (e.g., cylindrical) herein are to be considered modified by "substantially" regardless of whether expressly stated in the disclosure or claims, and specifically accounts for variations in the art as noted above.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

Figure 2:
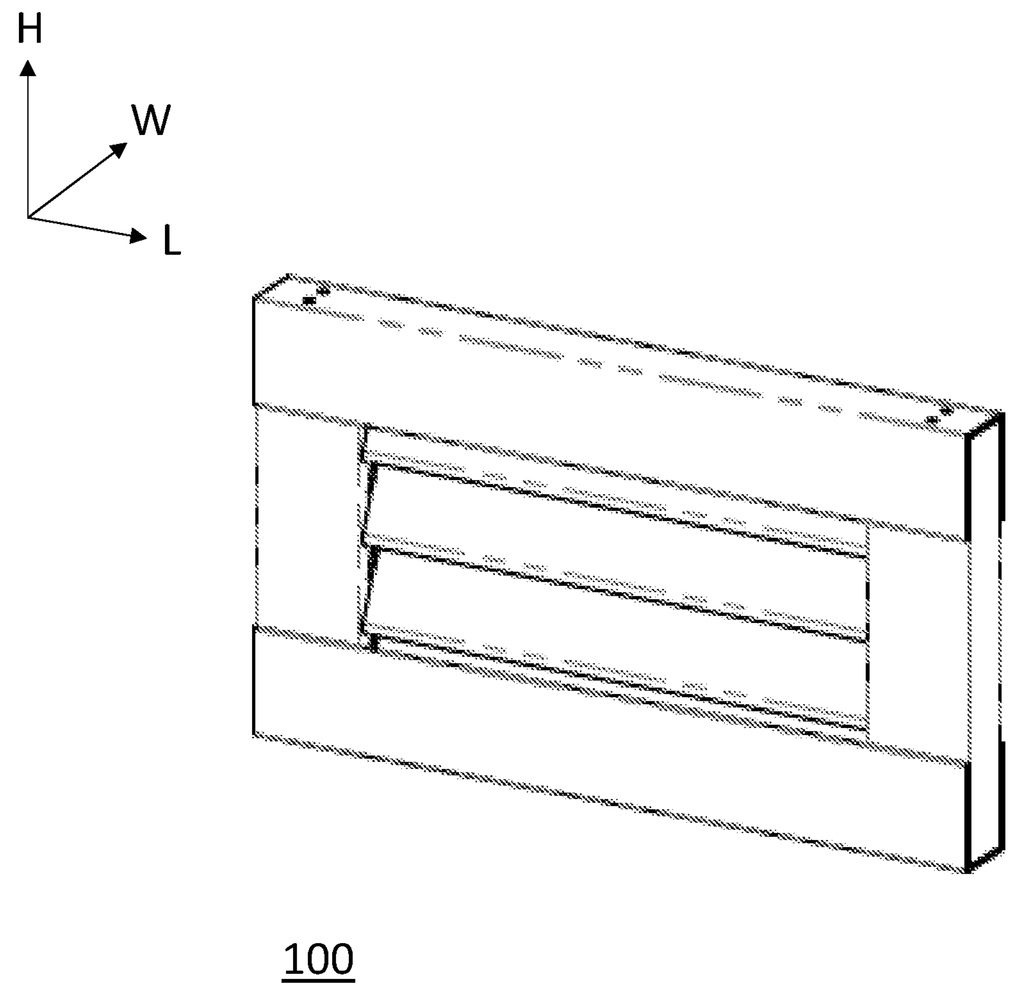
FIG. 2 shows a perspective view of an assembled state of the embodiment of FIG. 1.
Figure 3:
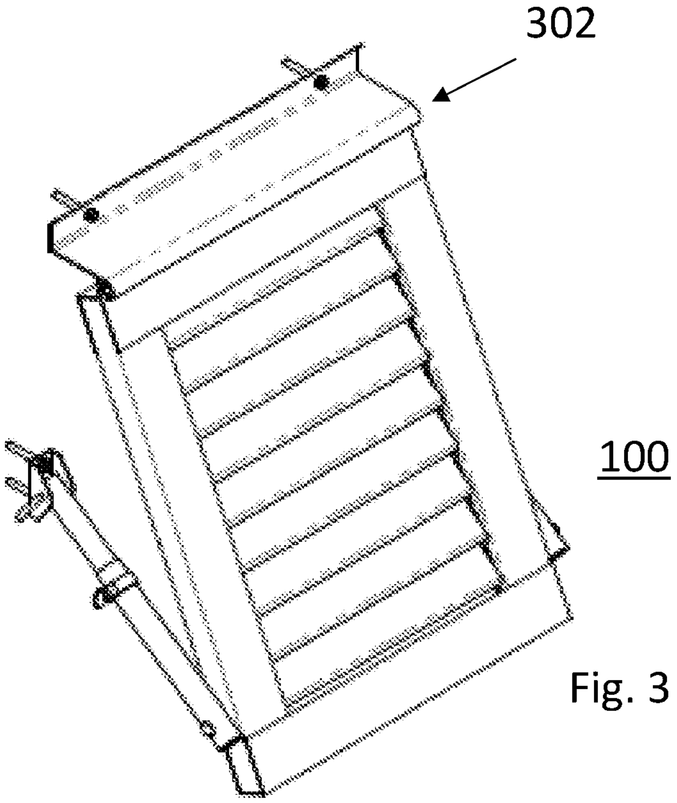
FIG. 3 shows an embodiment of the assembled state of FIG. 2 mounted on a wall.

Referring now to FIGS. 1-3, a shutter 100 is shown in an assembled state (FIGS. 2 and 3) and a disassembled state (FIG. 1). Shutter 100 includes a top rail 102, a bottom rail 104, left and right side rails 106L and 106R (collectively side rails 106). Top rail 102 and bottom rail 104 have inward facing U-shaped channels 112, for which side rails 106 have dimensions that fit snugly within the U-shaped channels 112 to form an overall rectangular frame.

Individual slats 108 are capped on each end by slat supports 110L and 110R. As discussed in more detail below, slat supports 110L and 110R will insert into slots in the side rails 106, and stack to align the slats 108. FIG. 2 illustrates how the individual pieces in FIG. 1 interconnect to form shutter 100.

Top rail 102, bottom rail 104, side rails 106 and slats 108 are preferably made of metal, such as extruded aluminum, and cut to a desired sizes. However, the invention is not so limited, and other materials may be used for some or all of the components. Slat supports 110L and 110R are preferably made from a plastic material that can withstand long term outdoor exposure. A non-limiting example of an appropriate material is NYLON or POM90. However, the invention is not so limited, and other materials may be used. Extruded components may be pre-cut to sizes for common sides openings and combined into a kit for such an opening, or sold in bulk where they can be cut to size at the installation site.

Shutter 100 will be rotatably mounted on or next to a wall over an opening, such as a door or window. FIG. 3 shows a non-limiting example of shutter 100 mounted on a wall by a hinge 302 using the same hinge attachment methodology as in U.S. Pat. No. 8,365,468. However, the invention is not so limited, and other connections for mounting may be used.

Figure 4:
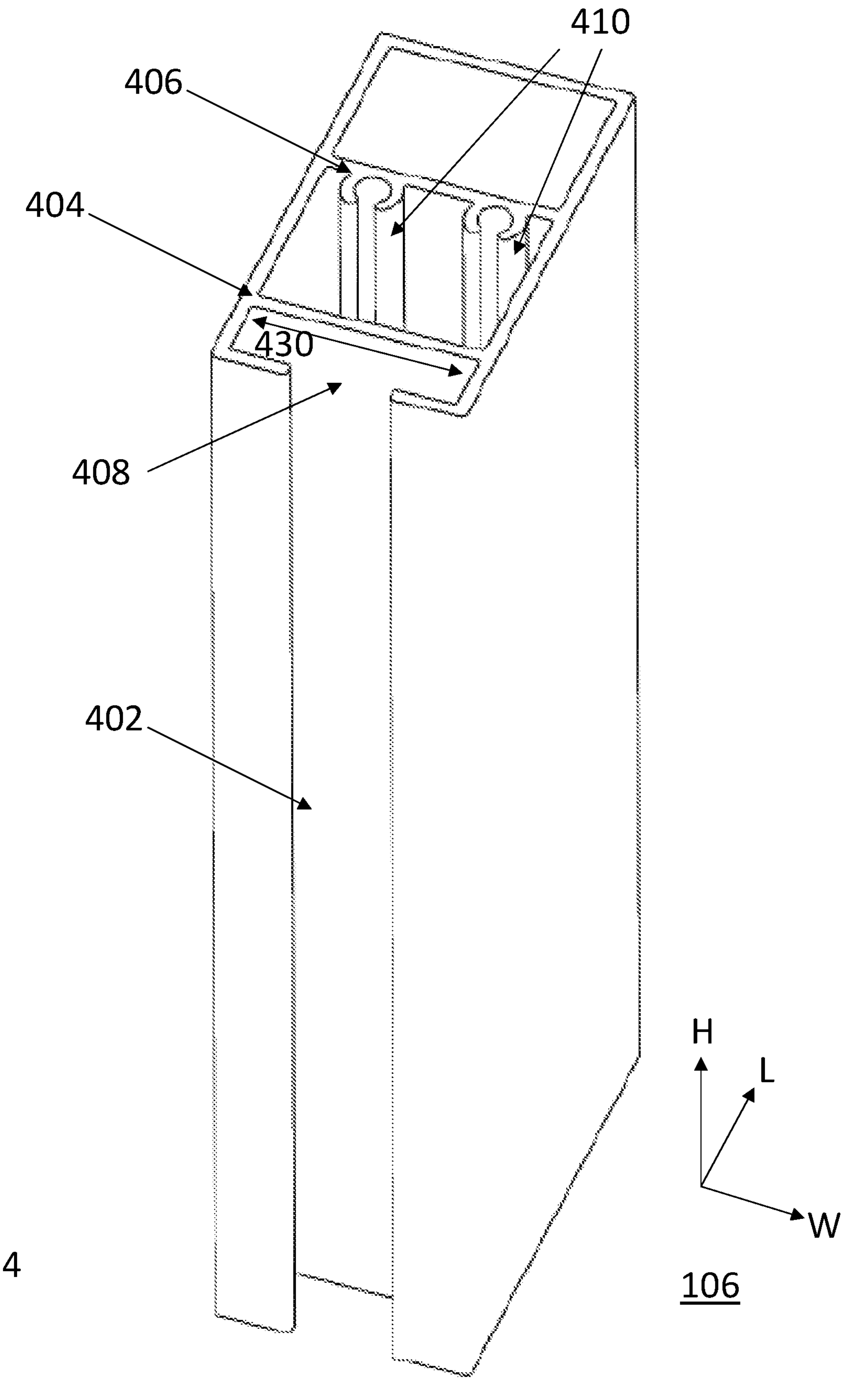
FIG. 4 shows a perspective view of a side rail of the embodiment of FIG. 1.
Figure 5:
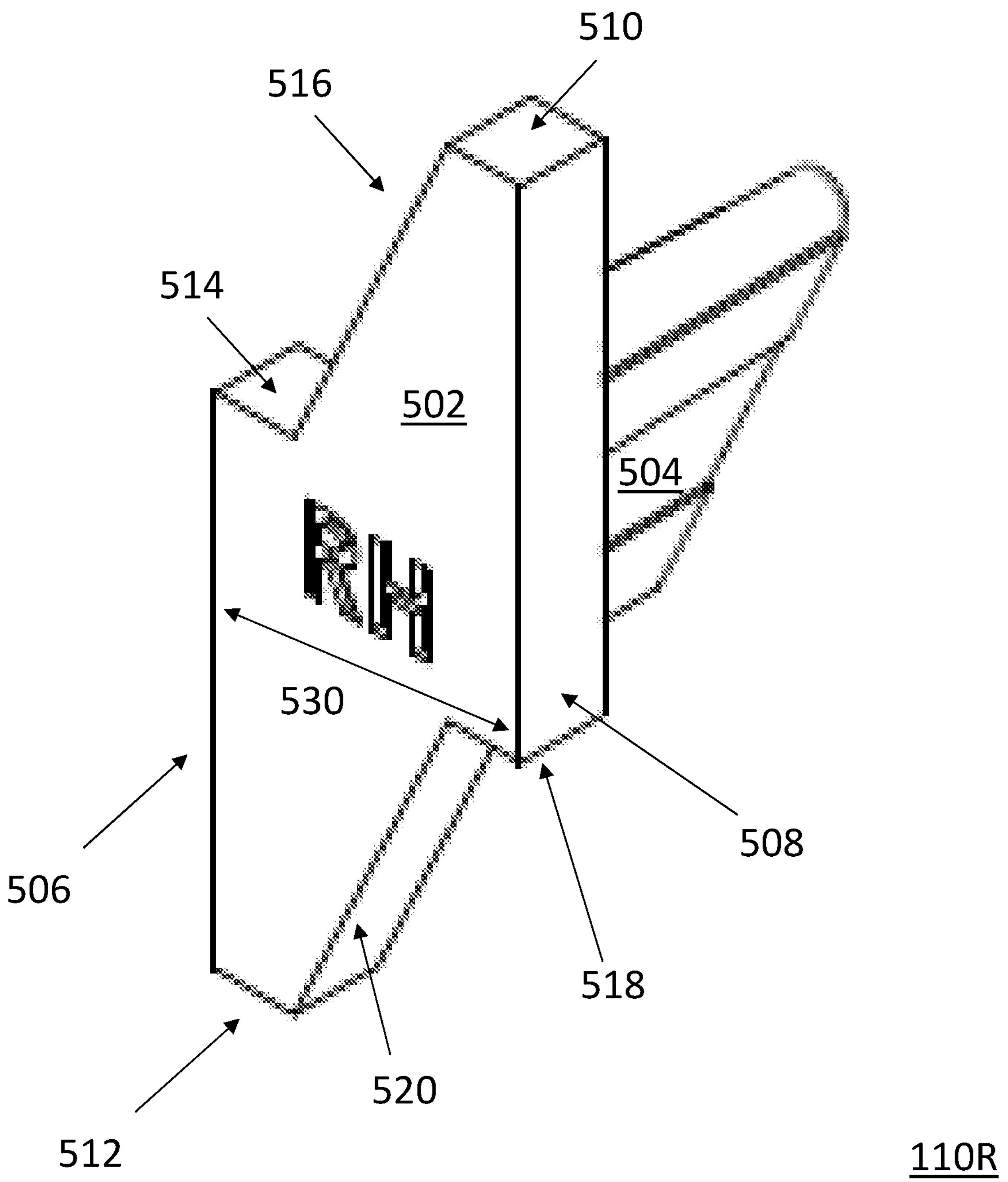

Referring now to FIG. 4, a side rail 106, which may be for the right or left side rails 106L or 106R, is shown in more detail. In this example side rail 106 is extruded aluminum which has been cut to a certain height. As FIG. 4 is a to-scale drawing, it is to be understood the height is merely exemplary, and the height of any particular side 106L may be longer or shorter based on, e.g., the size of the opening for the shutter to cover.

Side rail 106 has an overall rectangular shape with a cutout 402 on the side facing the interior of the shutter 100. An internal wall 404 extends from front to back of side rail 106. Internal wall 404 and an end portion of metal side rail 106 define a cavity 408 that is open along cutout 402. Cavity 408 has a width 430 that is preferably uniform along the height of side rail 106. As discussed in more detail below, slat supports 110 have a portion that will slide into cavity 408 and a portion that extends through cutout 402 to provide support for slats 108.

Another internal wall 406 extends across from the front to back of metal side rail 106. Screw bosses 410 as are known in the art are mounted on internal wall 406. Internal wall 406 may be positioned in side rail 106 to place screw bosses 410 at a substantially central location of metal side rail 106 for weight distribution purposes, but the invention is not so limited. Two screw bosses 410 are shown on internal wall 406 facing cutout 402, but the invention is not so limited and other numbers and/or locations of screw bosses 410 may be used.

Referring now to FIGS. 5-9, a slat support 110R is shown in more detail. The slat support 110R of FIGS. 5-9 is for insertion into the right hand side rail 106R from the perspective of FIG. 1, and thus has the "RH" designator. A slat support 110L for the left hand side rail 106 would be a mirror image of slat support 110R.

Each slat support 110R has an insertion side section 502 and a protrusion section 504.

Side section 502 may have an overall "lightning bolt" aesthetic shape. Side section 502 includes a front side 506 and a back side 508, with a width 530 there between. Width 530 of slat support 110R is preferably the same as width 430 of cavity 408, which as discussed in more detail below will allow slat support 110R to slide into cavity 408 of side rail 106R. Front side 506 and back side 508 are preferably flat and extend vertically as shown in the figures, but the invention is not so limited and other shapes may be used. Front side 506 and back side 508 preferably have a height that is more than half of the overall height of side section 502 and less than the full height of side section 502, but the invention is not so limited any other heights may be used. Front side 506 and back side 508 may have the same height such as shown in the figures, or different heights.

Side section 502 also includes a top surface 510 and a bottom surface 512. Both top surface 510 and bottom surface 512 are preferably flat and perpendicular to the front and back sides 506 and 508, but the invention is not so limited and other shapes or angles may be used.

An upwardly facing ledge 514 extends inward from the top of front side 506. A diagonal ledge 516 extends from upwardly facing ledge 514 toward top surface 510. Similarly, a downwardly facing ledge 518 extends inwardly from the bottom of front side 508, and a diagonal facing ledge 520 extends from downwardly facing ledge 518 toward bottom surface 512.

Figure 20A:
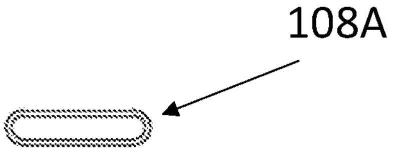
FIGS. 20A-20G are side views of various embodiments of slats.
Figure 20B:
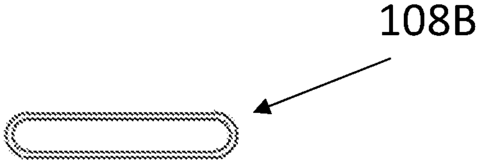
Figure 20C:
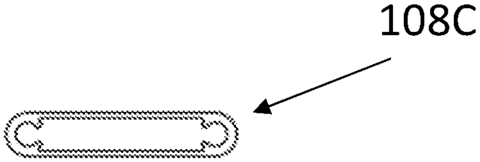

Protrusion section 504 of slat support 110R extends lengthwise into the interior of shutter 100. Protrusion section 504 has dimensions to snugly fit into the hollow interior of slat 108, and the dimensions of protrusion section 504 of FIGS. 5-9 are specific to a slat 108 with a hollow capsule shaped interior show in FIG. 20B. As seen in FIGS. 7 and 9, protrusion section 504 may narrow further away from side section 502 to facilitate a tighter grip during insertion, which has the added benefit of giving a degree of play to accommodate minor differences in length between different slats 108.

As discussed in more detail below, different slats may have different internal cavities or no cavities at all, and thus protrusion section 504 may have different shapes to match. The invention is not limited to any specific dimensions of the protrusion section 504.

Figure 10:
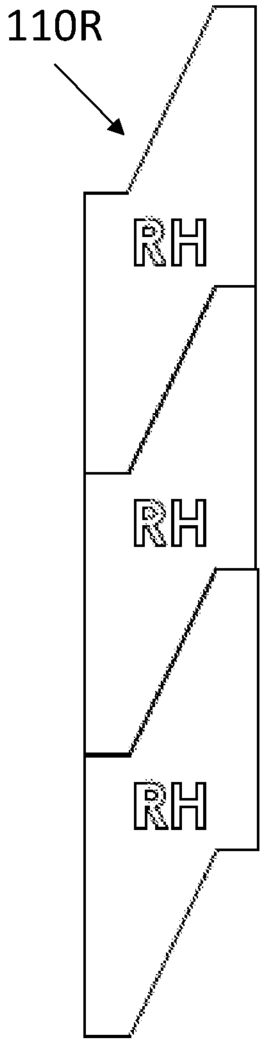
FIGS. 10-12 are side views of nesting slat supports according to an embodiment of the invention.
Figure 11:
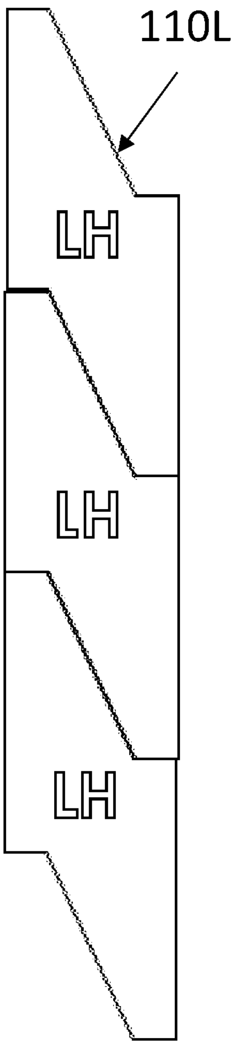

Slat supports 110 are stackable and nestable with each other. By way of non-limiting example, FIG. 10 shows three slat supports 110R are stacked on top of each other. For each set of adjacent slats supports 110R, the bottom surface 512 rests on the upwardly facing ledge 514, the downwardly facing ledge 518 rests on the top surface 510, and the diagonal facing ledge 520 mates with diagonal ledge 516. Protrusion sections 504 align in parallel with each other, and will support the slats 108 in a Bahama or Colonial shutter style orientation. FIG. 11 shows the corresponding configuration for slat supports 110L.

Figure 12:
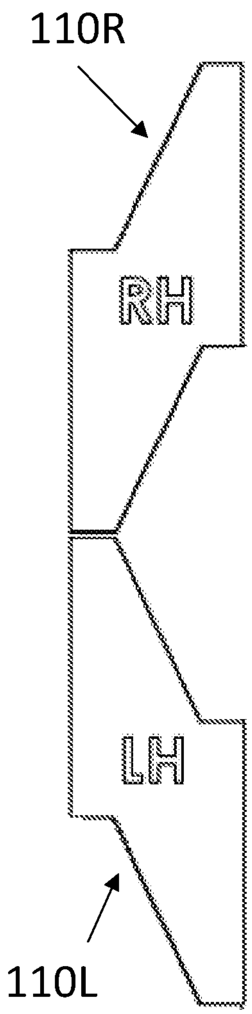

The mirror image nature of slat supports 110L and 110R prevents the wrong slat support from being stacked into a side rail 106. FIG. 12 shows an example of a slats support 110R being stacked on a slat support 110L, for which the two do not properly mate. The protrusion sections 504 would be at angles to each other and the slats 108 would not align as expects for a Bahama or Colonial shutter.

Figure 13A:
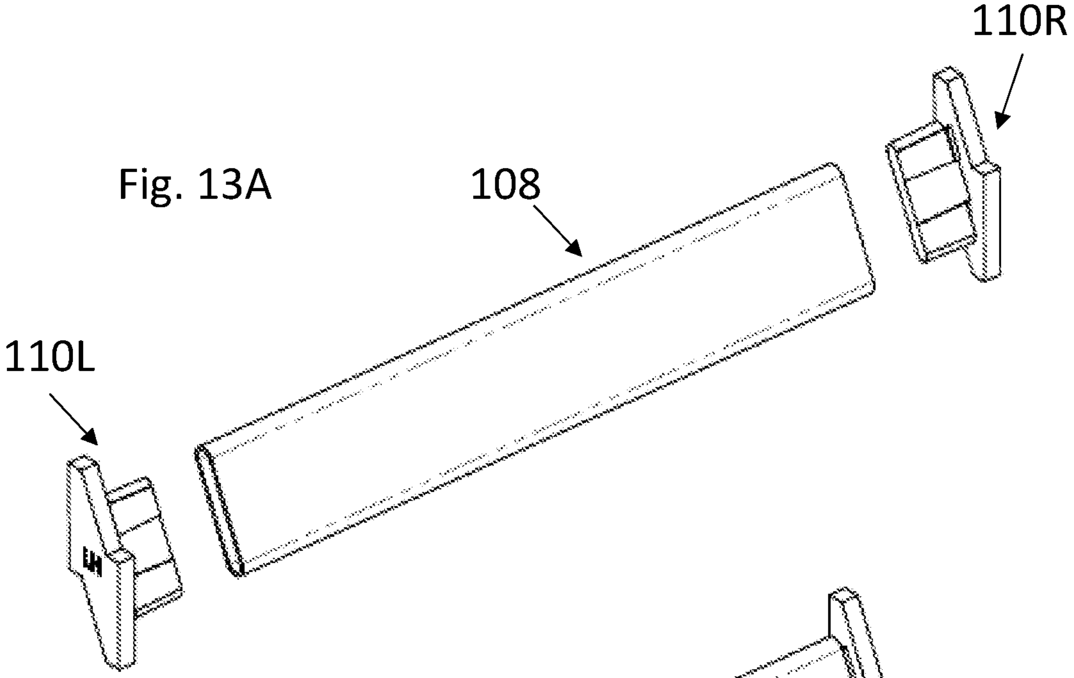
FIGS. 13A and 13B shows slat supports and slats in various state of assembly.
Figure 13B:
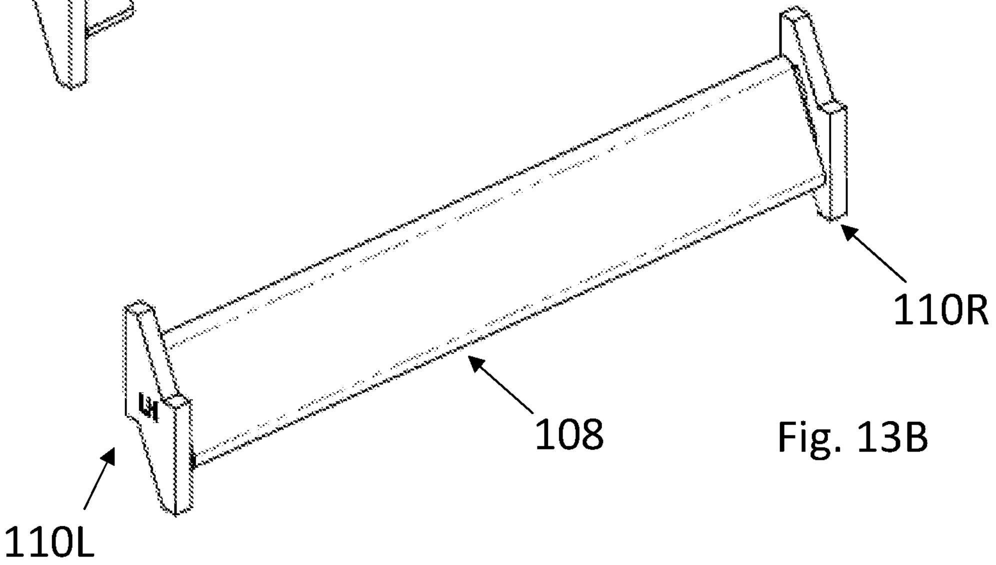

FIGS. 13A and 13B shows slat supports 110L and 110R on both sides of a slat 108, with FIG. 13A showing the disassembled state and FIG. 13B showing the assembled state.

Figure 14:
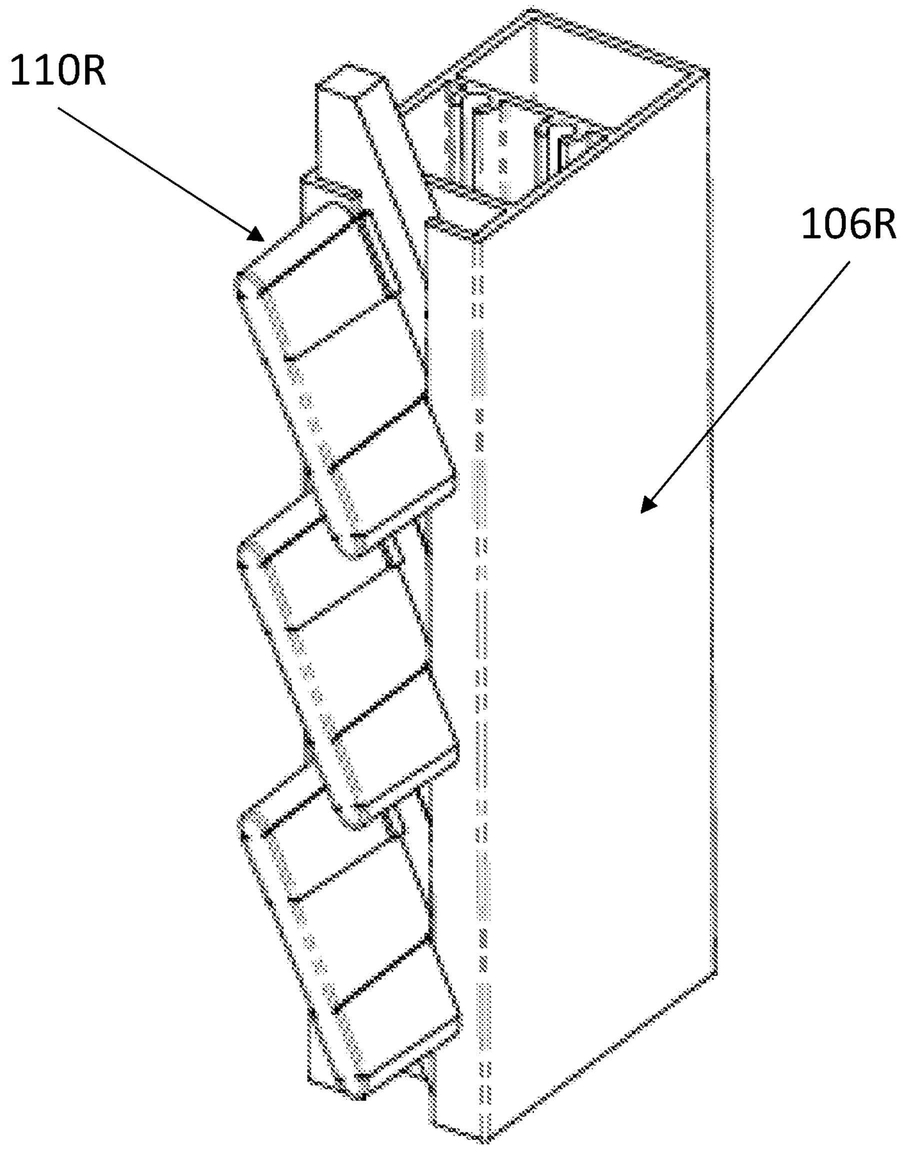
FIG. 14 is a perspective view showing how slat supports engage a side rail according to an embodiment of the invention.

As noted above, side sections 502 will insert into cavities 408 of side rails 106. Referring now to FIG. 14, stacked slat supports 110R are shown relative to the interior side walls of cavity 408. The front side 508 and side 506 are dimensioned to slide into side rail 106 and when nested together will not move back and forth or up and down. The angle of the diagonal ledges provide clearance for each slat support to stack without interference, as this allows the slats 108 to slightly overlap (in the horizontal plane the top of one slat slightly overlaps with the bottom of an adjacent slat) in a manner as is common for a Bahama or Colonial style shutter.

An embodiment of the method of assembly of shutter 100 is as follows. Top rail 102, bottom rail 104, side rails 106 and slats 108 are all cut to desired lengths. Side rails 106 are inserted into the U-shaped channel 112 of bottom rail 104. Screws or the like are inserted through bottom rail 104 and 106 to secure them together, preferably at the locations of the screw bosses 410. This will form a solid U-shaped portion of the shutter 100 that is ready to receive slats.

Individual slats 108 are mounted on pairs of slat supports 110L and 110R. Slat supports 110L and 110R with mounted slats 108 are lowered into cavities 408 of side rails 106L and 106R, respectively, by inserting the side sections 502 into the corresponding cavities 408; the protrusion section 504 will pass through cutout 402 and support slat 108 across the span of shutter 100. When the aperture is filled with slats 108, the, top rail 102 is added over the side rails 106 by inserting the top of side rails 106 into the U-shaped channel 112 of top rail 102. Screws or the like are inserted through top rail 102 and 106 to secure them together, preferably at the locations of the screw bosses 410. The shutter 100 can now be mounted to a wall in a manner as is known in the art.

Figure 15:
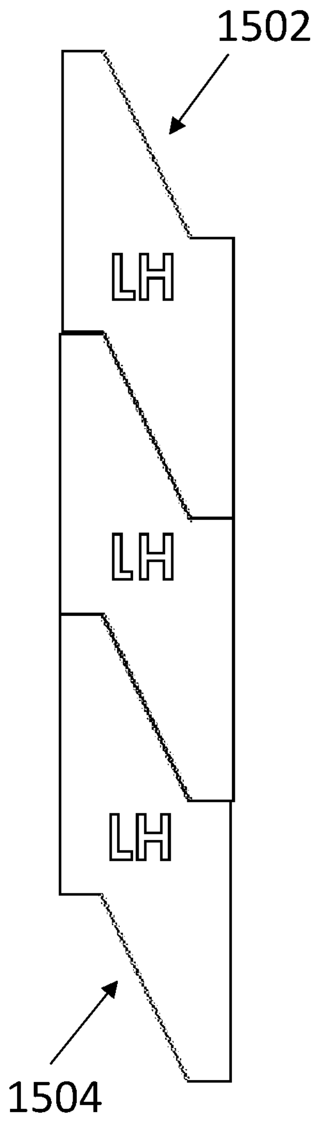
FIGS. 15-18 are side view of stacking arrangements of various embodiments of the invention.
Figure 16:
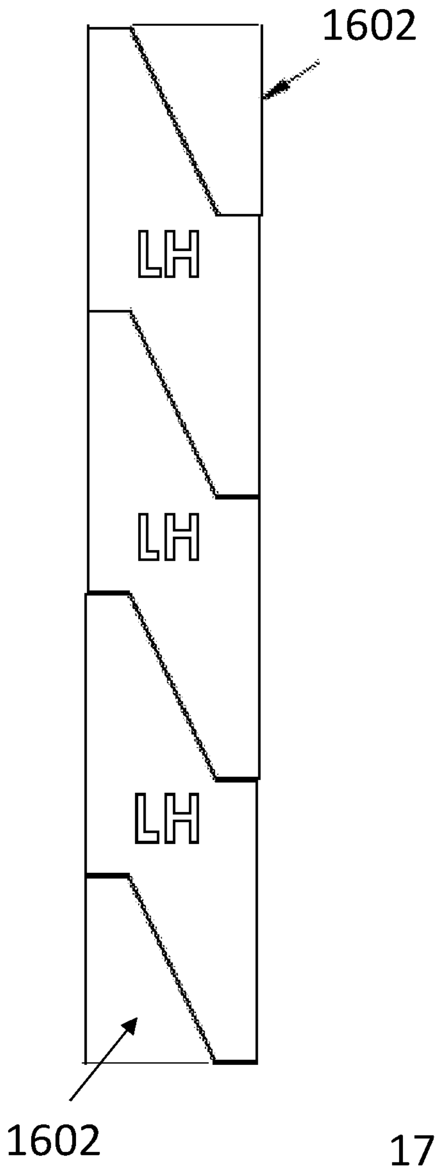
Figure 17:
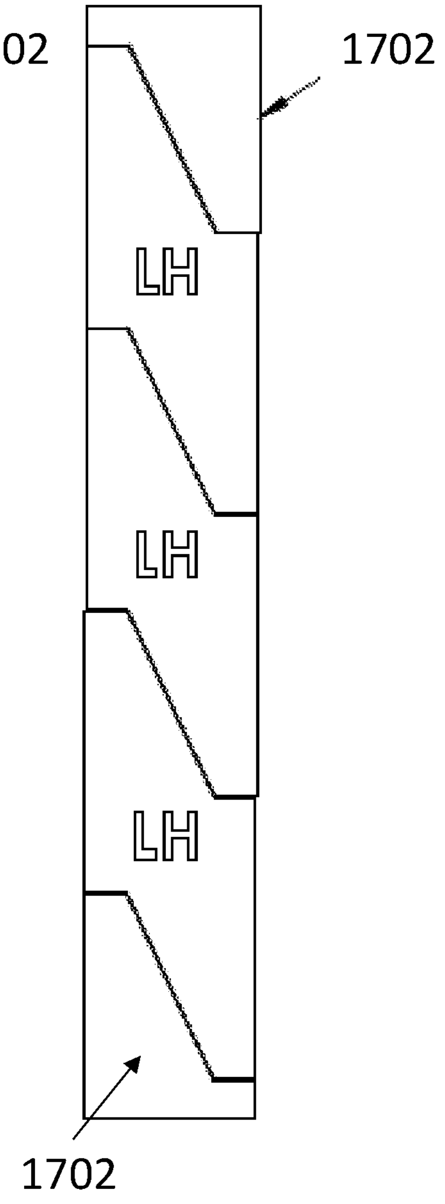

In the above embodiment, only the slat supports 110 are stacked into the cavities 408. In that configuration, there would be an empty space 1504 at the bottom of the stack and an empty space 1502 at the top of the stack such as shown in FIG. 15. These spaces need not be filled, but if there is a desire to fill them then appropriately shaped shims 1602 could be added such as shown in FIG. 16. In the alternative, shims 1702 could extend below the lowest slat support 110 such as shown in FIG. 17 to add additional height to adjust the placement of the slats 108; a similar shim 1702 could be added to the top to change the overall height of the top of the stack. Combinations of 1602 and 1702 could also be used.

Figure 18:
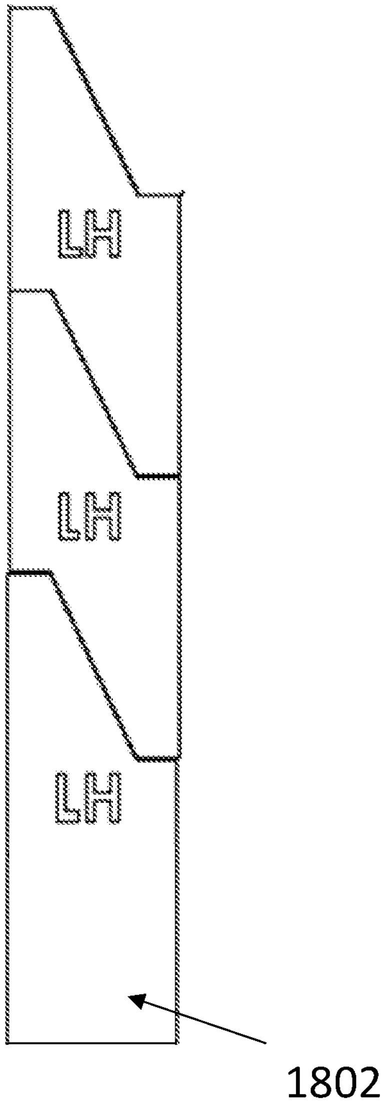

In the above embodiment, there are two types of slat supports 110L and 110R for the left and right sides, respectively. This provides a convenience of minimizing the number of parts. However, the invention is not so limited, and slat supports of a different shape could be used. By way of non-limiting example, a lowest slat support 1802 in FIG. 18—which is essentially a one-piece combination of slat support 110R with a shim 1702—could be used.

When installed, every pair of slat supports 110 may have a slat 108 mounted therein. However, the invention is not so limited. Based on the desired dimensions, there may be no need for a top slat or a second slat if the top rail 102 and bottom rail 104 extend far enough in height. In this case, unmounted slat supports and/or shims could be used, which reduces the overall weight and costs of the shutter 100.

According to another embodiment of the invention, the span of slats 108 may be so large that one or more supports are needed to prevent sag. An intermediate support column as known in the art such as shown in FIG. 4 of U.S. Pat. No. 8,365,468 is a non-limiting example of such a support.

Figure 19:
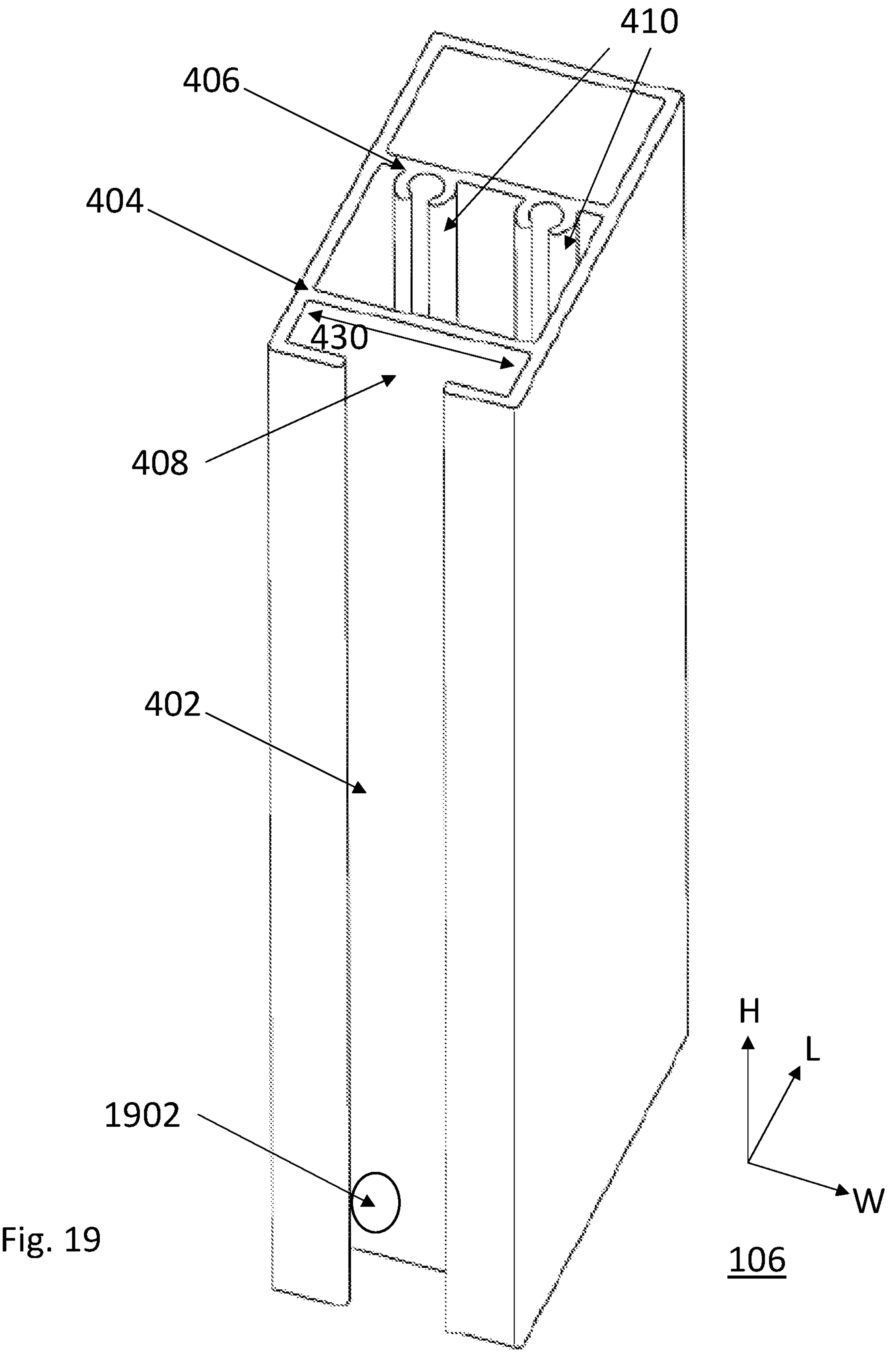
FIG. 19 is a perspective view of a side rail according to another embodiment of the invention.

Referring to FIG. 19, according to another embodiment of the invention, side rails 106 may include a stopper 1902 at the bottom thereof that projects into. Stopper 1902 may be integral with the side rail, or attached by screws, adhesive or welding. Stopper 1902 can act as a stopper or base for the lowest slat support 110 in the event that bottom rail 104 disconnects from shutter 100. Stopper 1902 may be integral with the side rail, or attached by screws, adhesive or welding. Stopper 1902 may be the head of a screw or bolt inserted through any appropriate wall of side rail 106.

Slat 108 in the above embodiments is capsule shaped with a hollow interior. However, the invention is not so limited and any shape may be used as appropriate. FIGS. 20A-20G show non-limiting examples of slat 108.

As shown in FIGS. 20C and 20E-G, the interior cavities of slats 108 C and E-G may have various screw bosses. In such embodiments, the protrusion section 504 may be shaped to match the space between the screw bosses, and side section 502 may have holes to accommodate screws that attach the slat support 110 to the slat 108C and E-G.

Figure 20D:
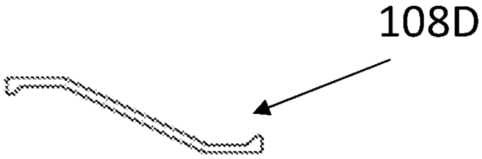
Figure 20E:
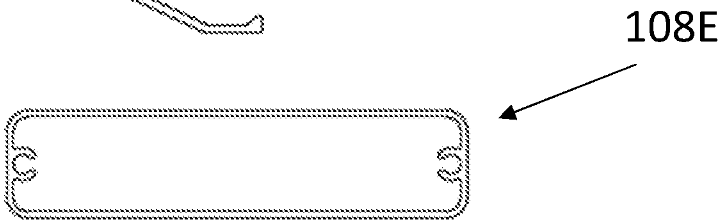
Figure 20F:
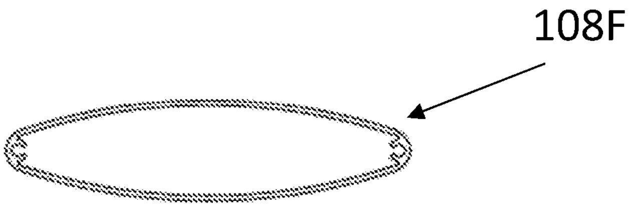
Figure 20G:
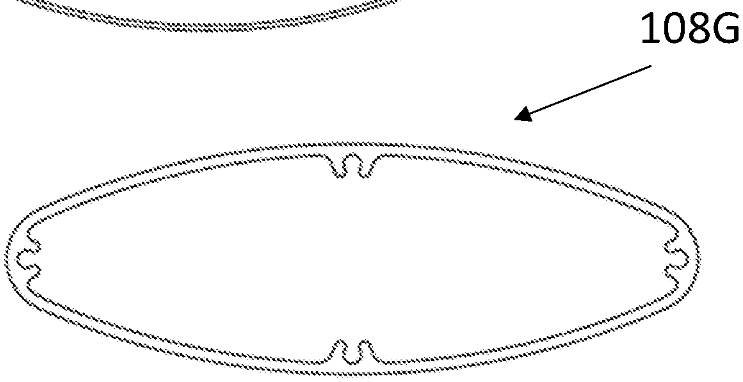

FIG. 20D shows a slat 108D with no interior cavity at all. In this case the protrusion section 504 would have a recess to accommodate the end of such a slat 108D.

Figure 21:
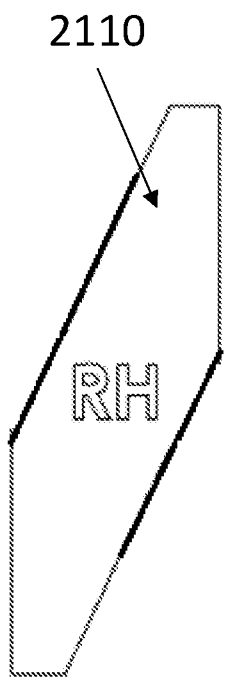
FIGS. 21 and 22 are side views of various embodiments of slat supports.
Figure 22:
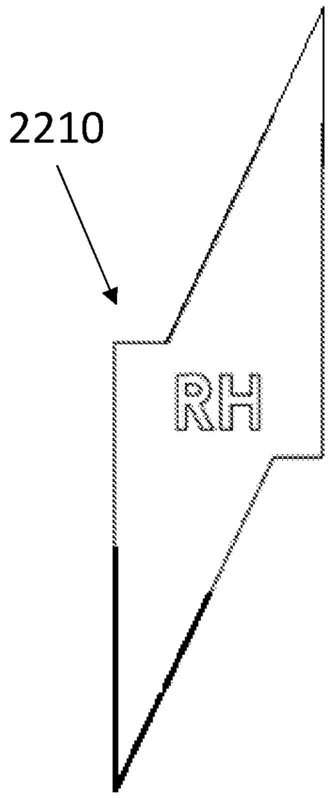

Slat support 110 in the above embodiments has a particular shape. However, the invention is not so limited, and other shapes may be used. FIGS. 21 and 22 show non-limiting examples of alternative slat supports 2110 and 2210.

Figure 23:
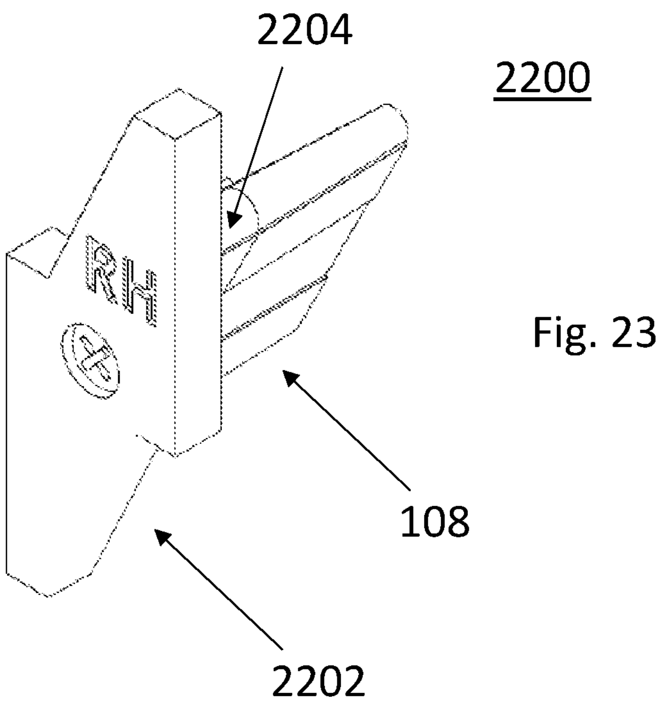
FIGS. 23 and 24 are perspective views of a two piece slat support.
Figure 24:
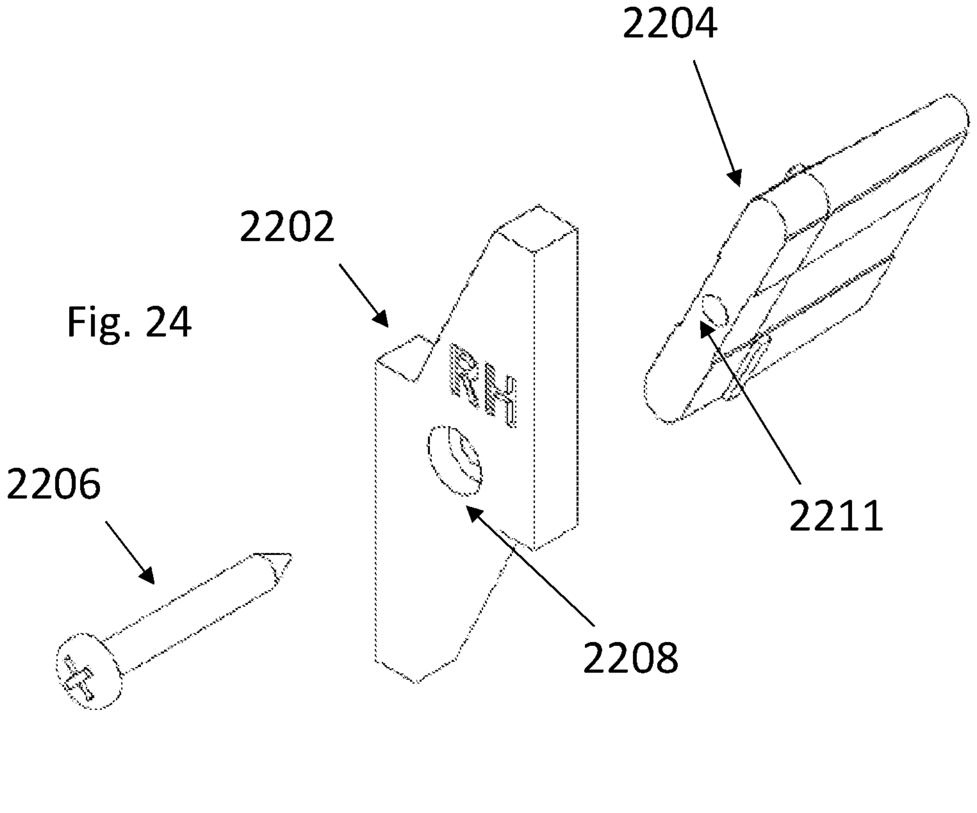

Referring now to FIGS. 23 and 24, another embodiment of a slat support is shown. The various slat supports discussed above were one piece design in which the protrusion section was permanently connected to the insertion side section by adhesive or molded as a common unitary component. In slat support 2200 the insertion side section 2202 and the protrusion section 2204 are separate components secured together by a screw 2206 or the like that extends through a hole 2208 inside section 2202 and into a side hole 2211 of protrusion section 2204. In this embodiment protrusion section 2204 acts as an insert or cap for the end of a slat 108. This design allows for a degree of adjustability in angles of slat 108 in the assembled shutter, as components can be loosely assembled, the slats rotated into the desired angle and then tightened for long term placement.

The interior facing sides of side sections 2202 may have protrusions and or grooves that limit either the angular positions of the protrusion sections 2204 (including limiting it to only one position, in which case the design is a two piece version of the unitary slat support) or range of rotation of the angular positions. Such angular limitations may be appropriate in jurisdictions that have requirements on slat angles to provide appropriate protection against flying debris. An alignment tool, such as a parallelogram shaped alignment block with a specific angle for the slats (e.g., 30 or 45 degrees), may be placed between adjacent slats during assembly so that all slats have the same angle relative to each other for a uniform aesthetic appearance.

In the above embodiment, the slats 108 are in a fixed position. Another embodiment allows for adjustable slats moveable to different orientations relative to the shutter.

Figure 25:
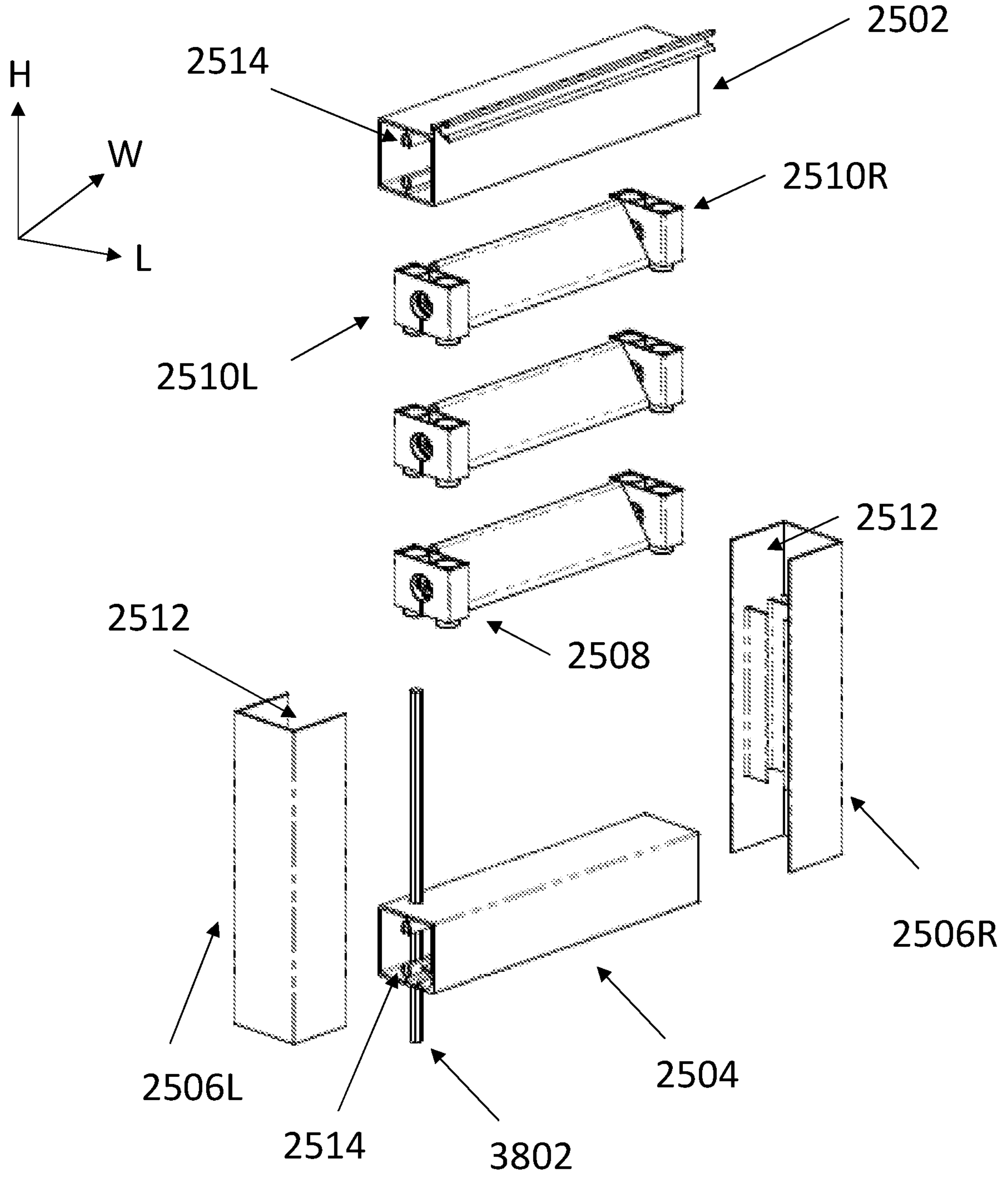
FIG. 25 shows an exploded view of an embodiment of the invention.

Referring now to FIGS. 25-27, a shutter 2500 is shown in a disassembled state (FIG. 25), an assembled state (FIG. 26), and a mounted state (FIG. 27). Shutter 2500 includes a top rail 2502, a bottom rail 2504, left and right side rails 2506L and 2506R (collectively side rails 2506). Side rails 2506 have an overall U-shaped exterior defining a U-shaped channel 2512. Top rail 2502 and bottom rail 2504 may be rectangular and have dimensions that fit snugly within the U-shaped channels 2512 to form an overall rectangular frame as shown in FIG. 26. Screws (not shown) and screw bosses 2514 connect top rail 2502, bottom rail 2504, and side rails in a manner known in the art.

Individual slats 2508 are capped on each end by slat supports 2510L and 2510R, (collectively slat support 2510).

As discussed in more detail below, slat supports 2510 will insert into cavities in the side rails 2506, and stack to align the slats 2508. FIG. 26 illustrates how the individual components in FIG. 25 interconnect to form shutter 2500.

A drive shaft 3802 engages on one side of shutter 2500 with slat supports 2510. Rotation of drive shaft 3802 will rotate slats 2508 into different angular positions within shutter 2500 as discussed in more detail below, Top rail 2502, bottom rail 2504, side rails 2506, and slats 2508 are preferably made of metal, such as extruded aluminum, and cut to a desired size. However, the invention is not so limited, and other materials may be used for some or all of the components. Extruded components may be pre-cut to sizes for common sides openings and combined into a kit for such an opening or sold in bulk where they can be cut to size at the installation site.

Slat supports 2510 are preferably made from a plastic material that can withstand long term outdoor exposure. A non-limiting example of an appropriate material is NYLON or POM90. However, the invention is not so limited, and other materials may be used.

Shutter 2500 will be rotatably mounted on, or next to, a wall over an opening, such as a door or window. FIG. 27 shows a non-limiting example of shutter 2500 mounted on a wall by a hinge 2702 using the same hinge attachment methodology as in U.S. Pat. No. 8,365,468. However, the invention is not so limited, and other connections for mounting may be used.

Referring now to FIGS. 28 and 29, side rail 2506 is shown in more detail. In this example side rail 2506 is extruded aluminum which has been cut to a certain height. As FIG. 28 is a to-scale drawing, it is to be understood that the height is merely exemplary, and the height of any particular side rail 2506 may be longer or shorter based on, e.g., the size of the opening for the shutter to cover.

Side rail 2506 has an overall exterior U-shape with an open end 2802 on the side facing the interior of the shutter 2500. Flanges 2804 extends widthwise from front to back of side rail 2506 and define an opening 2810 in the height direction. A rear wall 2806 extends widthwise from front to back of side rail 2506. Flanges 2804 and rear wall 2806 define an open cavity 2808. Cavity 2808 has a length that is preferably uniform along the height of side rail 2506. As discussed in more detail below, slat supports 2510 have a first section that will slide into cavity 2808 and a second section that extends through opening 2810 to provide support for slats 108.

Flanges 2804 as shown do not extend the full height of side rail 2506, and may have ends that terminate below the top of side rail 2506 and/or above the bottom of side rail 2506. This creates top and bottom gaps inside side rails 2506 to accommodate the top and bottom rails 2502 and 2504, respectively, as shown in FIGS. 25 and 26. However, the invention is not so limited, and the flanges may extend higher or lower than shown. Flanges 2804 may be initially formed over the full length of side rail 2506 and later machined down to the desired size.

Figure 30:
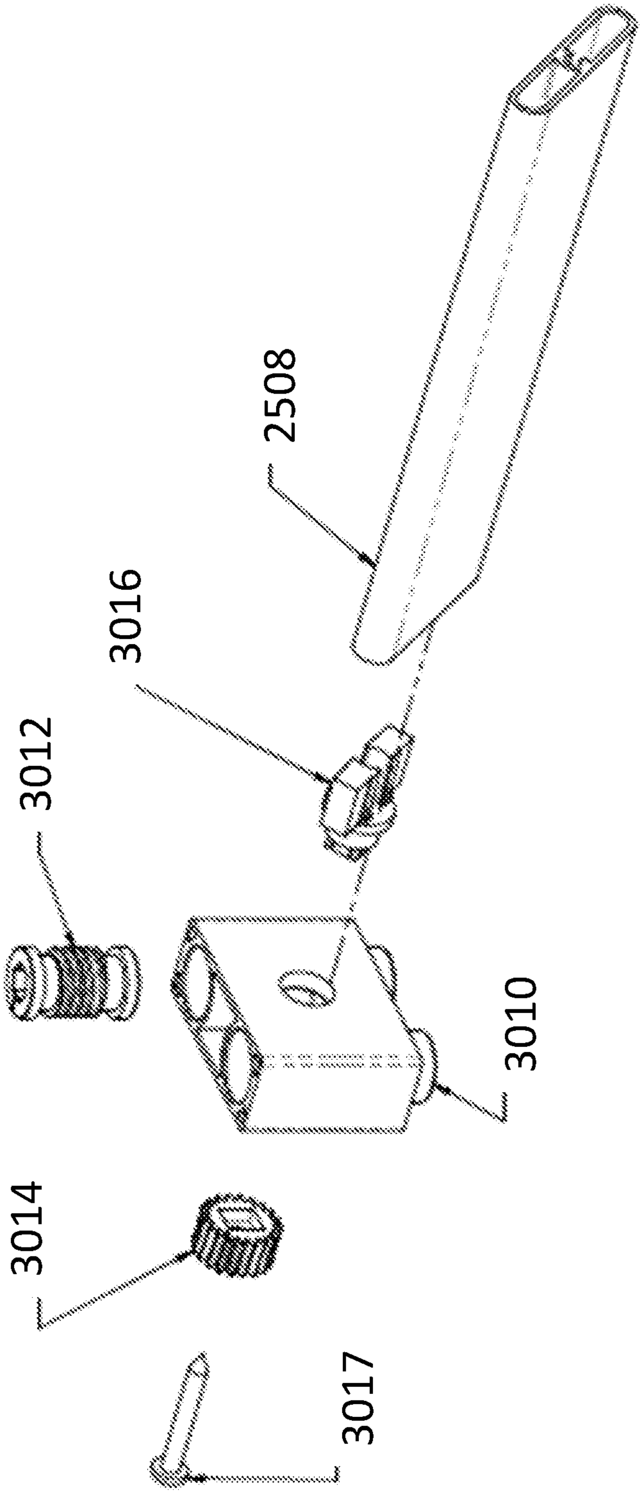
FIG. 30 shows an exploded view of a slat support and slat according an embodiment of the invention.
Figures 31A, 31B, 31C, 31D:
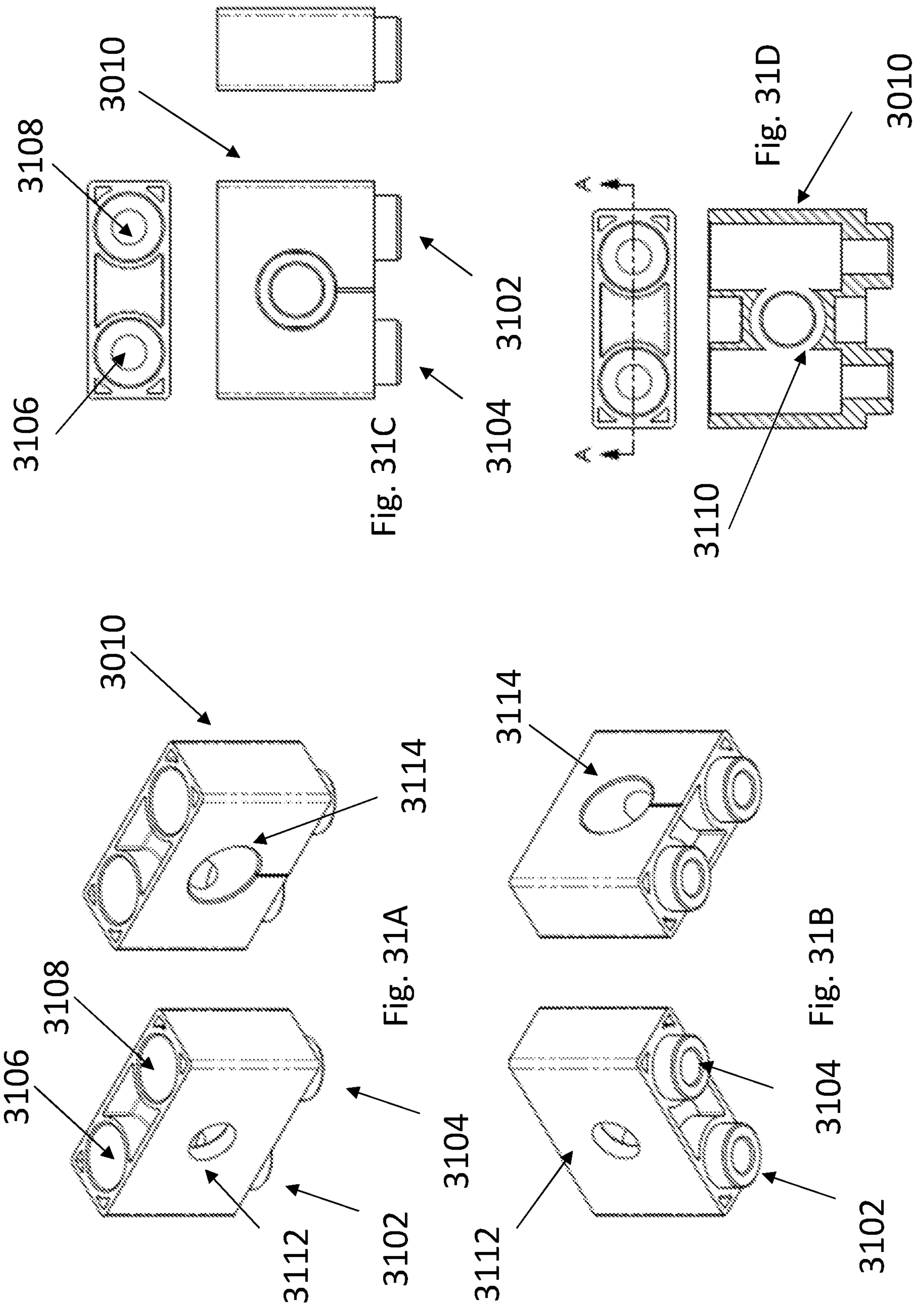
FIGS. 31A-31D show various views of a slat support according to an embodiment of the invention.

Referring now to FIG. 30, slat support 2510 is shown in more detail relative to slat 2508. Slat support 2510 includes a gear housing 3010, a worm screw 3012, a worm wheel gear 3014, a slat insert 3016, and a retaining screw 3017.

Referring now to FIGS. 31A-31D, gear housing 3010 has a generally rectangular shape with two lower projections 3102 and 3104, each of which may have a hollow interior. Two chambers 3106 and 3108 extend through the gear housing 3010 above the two lower projections 3102/3104. An interior cavity 3110 is defined between chambers 3022 and 3024. The internal walls of chambers 3106 and 3108 may be open at a mid-height region, such that the interior cavity 3110 is open to the interior portions of chambers 3106 and 3108. The slat facing side of gear housing 3010 has an interior facing hole 3112, and the opposite side has an exterior facing hole 3114. Holes 3112 and 3114 are coaxial and may provide a continuous lateral opening through gear housing 3010. Hole 3112 preferably has a smaller diameter than hole 3114.

Figure 32:
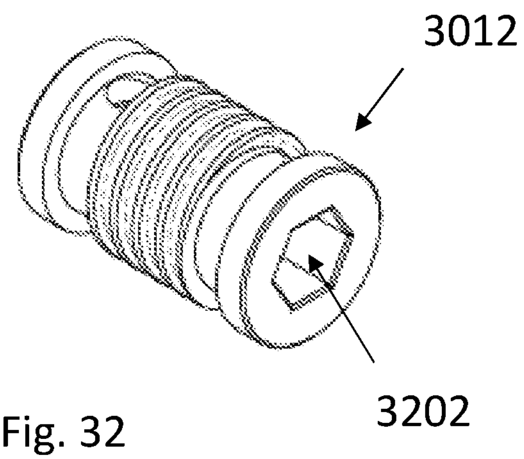
FIG. 32 is a perspective view of a worm screw according to an embodiment of the invention.
Figure 33:
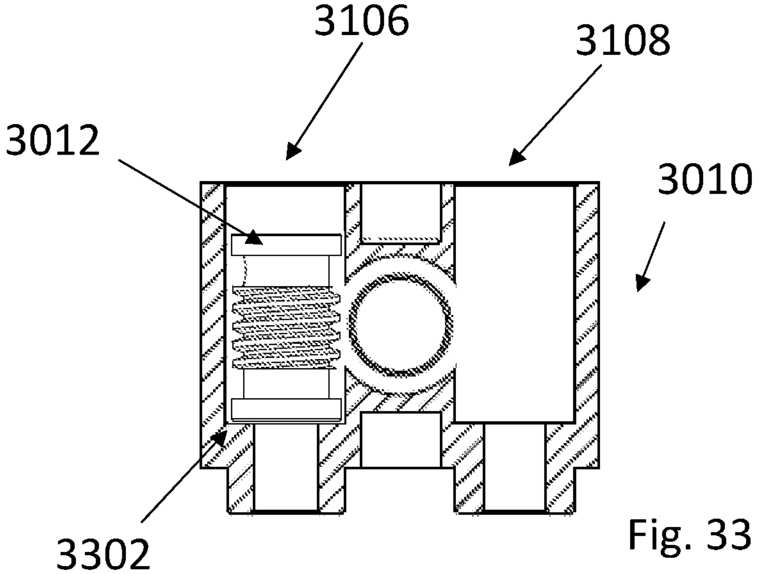
FIG. 33 is a cross section view of a gear housing with an inserted worm screw according to an embodiment of the invention.

Referring now to FIGS. 32 and 33, worm screw 3012 has an exterior screw thread and interior cavity 3202 shaped to receive a corresponding drive shaft 3802 (e.g., hex, square, etc.) as discussed below. Worm screw 3012 is shaped to fit into chambers 3106 and/or 3108. The bottom of chambers 3106 and 2108 have a lip 3302 on which the bottom of worm screw 3012 rests and remains retained within the gear housing 3010. Worm screw 3012 is accessible from the interior cavity 3110 by virtue of the openings in the internal walls of chambers 3106 and 3108.

Referring now to FIGS. 34A and 34B, gear 3014 has an exterior facing screw receiving recess 3402 and a coaxial interior facing drive shaped recess 3404 (e.g., square, hex, etc.). A smaller screw hole 3406 connects recesses 3402 and 3404 and is shaped to receive screw 3017 as discussed in more detail below.

Gear 3014 fits within the exterior facing hole 3114 of gear housing 3010 and can be inserted up until it meets the interior wall of gear housing 3010. This brings the teeth of worm screw 3012 into engagement with the teeth of gear 3014, such that rotation of worm screw 3012 induces rotation in gear 3014.

Referring now to FIGS. 35A-35C, slat insert 3016 relative to slat 2508 is shown. Slat insert 3016 includes a drive projection 3502, a first cylindrical portion 3504, a second cylindrical portion 3506, a hole 3508 down the center, and two slat projections 3510 on either side of hole 3508.

Assembly of slat insert 3016 with slat 2508 is as shown in FIG. 35B. Worm screw 3012 is inserted into one of the two cavities 3106/3108. Gear 3014 is inserted into gear housing 3010 through exterior facing hole 3114. The drive projection 3502 is inserted into gear housing 3010 through interior facing hole 3112 to engage with interior facing drive shaped recess 3404 of gear 3014, causing first cylindrical portion 3504 to engages with interior facing hole 3112 of gear housing 3010 and rotated freely therein. This places second cylindrical portion 3506 adjacent the outer wall of gear housing 3010 to act as a stabilizing washer. Slat projections 3510 insert into the hollow interior of slat 2508 on either side of screw boss 3512.

Screw 3017 inserts through hole 3406 of gear 3014, hole 3508 of the center of slat insert 3016, and into the screw boss 3512 of the slat 2508. Screw 3017 holds the assembly together, such that rotation of worm screw 3012 rotates, gear 2014, which in turn rotates slat insert 3016 to alter angle of slat 2508 within shutter 2500.

Referring now to FIGS. 36 and 37, the assembled and exploded state of a pair of slat supports 2510 and slat 2508 are shown. In this example, only one of the two gear housing includes worm screw 3012. In theory, worm screw 3012 could be placed on gear 3012, although that would overly complicate the driving methodology without any corresponding benefit. However, the invention is not so limited.

Referring now to FIG. 38, a drive shaft 3802 is shaped to engage interior cavity 3202 of worm screw 3014. Drive shaft 3802 is either connected or connectable to a motor 3804 or handle (not shown). Rotation of drive shaft 3802 by handle or motor changes the angle of the slat 2508 in the manner discussed above.

Referring now to FIGS. 39-40, gear housings 3010 are nestable in an upward stacking direction. The two lower projections 3102 and 3104 are sized and shaped to insert into chambers 3106 and 3106 of an adjacent gear housing 3010. This creates two hollow interior pathways that extends through a series of nesting gear housings 3010, either of which can receive worm screws 3014 and drive shaft 3802.

As seen in FIG. 25, drive shaft 3802 accesses worm screws 3012 through holes in bottom rail 2504. Draft shaft 3802 can be mounted in shutter 2500 for long term use, or removable inserted only when needed.

There is no required specific placement of worm screw 3012 relative to the four available cavities 3106/2108 in the left and right gear housings 3010. Applicants have found that selection of a forward most (furthest from the structure to which shutter 2500 is mounted) is more convenient as it is easier to access, although the invention is not so limited. Once a cavity is selected, that same cavity is preferably also used for other gear housings 3010 in the stack so that all the worm screws 3014 receive the drive shaft 3802.

Referring now to FIGS. 35B and 41, the stacking of slat supports 2510 within side rail 2506 is shown. As discussed above, bottom rail 2504 inserts into the channel 2512 of side rail 2506 below flanges 2804 and rear wall 2806. The gear housing 3010 portion of slat insert 3016 lowers into the cavity 2808 between rear wall 2806 and flanges 2804. The slat insert 3510 portion of slat insert 3016 passes through the gap 2180 between the flanges and extends away from flanges 2804.

Referring now to FIGS. 42-44, the above embodiments allow for rotation of slats 2508 into different angular positions relative to shutter 2500. FIG. 41 shows the slats in an orientation consistent with the shape of a classic Bahama style shutter in which each shutter overlaps in the horizontal direction to block incoming debris. FIG. 42 shows the slats 2508 in a fully closed position. FIG. 43 shows the slats in a horizontal orientation.

In the above embodiments, two slat supports 2510 flank slat 2508, but only one of the two includes worm screw 3012. In theory, worm screw 3012 could be placed in both slat supports 2510, although that may overly complicate the driving methodology without any corresponding benefit.

In the above embodiments, side rail 2506 and slat supports 2510 can be used on both sides of shutter 2500. This provides a convenience of minimizing the number of parts. However, the invention is not so limited. Side rails 2506 and slat supports 2510 could be used on only one side as the drive and support mechanism, while another configuration of components could be used on the other side.

In the above embodiments, the slat supports 2510 are directly nested from the bottom rail 2504 to the top rail 2502. However, the invention is not so limited. Any number of spacers could be inserted above, below, or in the stack if desired. Spacers could be gear housings 3010 without some or all of the components of an entire slat support 2510. A spacer could be block version of gear housing 3010, such as spacer 4502 in FIG. 45. A spacer may be nothing more than a rectangular block that does not next with adjacent components. The invention is not limited to the shape or placement of such a spacer.

Slat 2508 in the above embodiments is capsule shaped with a hollow interior around a central screw boss 3512. However, the invention is not so limited and any shape may be used as appropriate.

The above embodiments provide for various improvements in manufacture relative to the prior art. There is no need to mill slots to receive slats 108, and thus the problems with milling to specific accuracy is eliminated completely. The slats do not need to extend into the side rails 106, which reduced the overall weight and manufacturing costs. From a painting perspective, paint can be added to the individual components before assembly, as there nature of the assembly does not create the same concerns over potential scratches to the paint during assembly.

The specification and drawings are to be regarded in an illustrative rather than a restrictive sense. It will, however, be evident that various modifications and changes may be made thereunto without departing from the broader spirit and scope of the invention as set forth in the claims.

What is claimed is:

1. A shutter, comprising:

first and second side rails having cavities running in a direction from top to bottom, each cavity having an opening along a lateral side;

a plurality of pairs of slat supports, each pair having a slat support mounted in the cavity of the first rail and mounted in the cavity of the second rail, each slat support having a first section and a second section, comprising:

the first section having a shape to slide into one of the cavities, and to stack and nest with an adjacent first section of another slat support in the one of the cavities;

the second section protruding through the opening of the one of the cavities; and a plurality of slats, each slat mounted on the second sections of one of the pairs of slat supports;

each first section of each slat support comprises:

an upward facing horizontal top side extending from a first end of a vertical back side;

a front diagonal side extending from an end of the horizontal top side;

an upward facing horizontal ledge side extending from an end of the front diagonal side;

a vertical front side extending from an end of the horizontal ledge side;

a downward facing horizontal bottom side extending from a first end of the vertical front side;

a back diagonal side extending from an end of the horizontal bottom side, the back diagonal side being parallel to the front diagonal side;

a downward facing ledge side extending from an end of the back diagonal side and from a second end of the vertical back side; and the vertical front side and the vertical back side defining an overall width of the slat support, the width matching a width of the cavity of one of the rails;

wherein adjacent slat supports in the cavity of one of the rails are configured to nest such that the downward facing horizontal ledge side, the back diagonal side, and the downward facing horizontal bottom side of one of the adjacent slat supports rests on and directly contacts the upward facing horizontal top side, the front diagonal side, and the upward facing horizontal ledge side, respectively, of the other of the adjacent slat supports.

2. The shutter of claim 1, wherein the vertical front side and the vertical back side each have a height (a) greater than half of the overall height of the slat support and (b) less than the overall height of the slat support.

3. The shutter of claim 1, wherein the shutter defines a vertical plane, and the second section is at an angle to the vertical plane to support the slats at an angle to the vertical plane.

4. The shutter of claim 1, wherein the slats are hollow, and the second section inserts into a hollow interior of a slat.

5. The shutter of claim 1, wherein at least a portion of the second section narrows as it extends away from the first section.

6. The shutter of claim 1, further comprising:

each of the pairs of slat supports includes a first slat support and a second slat support;

wherein the first and second slat supports are mirror images such that a first slat support within a common side rail will not nest with a second slat support with the common side rail.

7. A shutter kit, comprising:

first and second side rails having cavities running from top to bottom, each cavity having an opening along a lateral side;

a plurality of pairs of slat supports, each pair having a slat support mounted in the cavity of the first rail and mounted in the cavity of the second rail, each slat support having a first section and second section, comprising:

the first section having a shape to slide into one of the cavities, and to stack and nest with an adjacent first section of another slat support in the one of the cavities;

the second section protruding through the opening of the one of the cavities; and a plurality of slats, each slat mountable on the second sections of one of the pairs of slat supports;

each first section of each slat support comprises:

an upward facing horizontal top side extending from a first end of a vertical back side;

a front diagonal side extending from an end of the horizontal top side;

an upward facing horizontal ledge side extending from an end of the front diagonal side;

a vertical front side extending from an end of the horizontal ledge side;

a downward facing horizontal bottom side extending from a first end of the vertical front side;

a back diagonal side extending from an end of the horizontal bottom side, the back diagonal side being parallel to the front diagonal side;

a downward facing ledge side extending from an end of the back diagonal side and from a second end of the vertical back side; and the vertical front side and the vertical back side defining an overall width of the slat support, the width matching a width of the cavity of one of the rails;

wherein adjacent slat supports in the cavity of one of the rails are configured to nest such that the downward facing horizontal ledge side, the back diagonal side, and the downward facing horizontal bottom side of one of the adjacent slat supports rests on and directly contacts the upward facing horizontal top side, the front diagonal side, and the upward facing horizontal ledge side, respectively, of the other of the adjacent slat supports.

8. The shutter kit of claim 7, wherein the vertical front side and the vertical back side each have a height (a) greater than half of the overall height of the slat support and (b) less than the overall height of the slat support.

9. The shutter kit of claim 7, wherein the shutter defines a vertical plane, and the second section is at an angle to the vertical plane to support the slats at an angle to the vertical plane.

10. The shutter kit of claim 7, wherein the slats are hollow, and the second section is insertable into a hollow interior of a slat to mount the slat onto a slat support.

11. The shutter kit of claim 7, wherein at least a portion of the second section narrows as it extends away from the first section.

12. The shutter kit of claim 7, further comprising:

each of the pairs of slat supports includes a first slat support and a second slat support;

wherein the first and second slat supports are mirror images such that a first slat support within a common side rail will not nest with a second slat support with the common side rail.

13. A slat support for a shutter, comprising:

a first section comprising:

an upward facing horizontal top side extending from a first end of a vertical back side;

a front diagonal side extending from an end of the horizontal top side;

an upward facing horizontal ledge side extending from an end of the front diagonal side;

a vertical front side extending from an end of the horizontal ledge side;

a downward facing horizontal bottom side extending from a first end of the vertical front side;

a back diagonal side extending from an end of the horizontal bottom side, the back diagonal side being parallel to the front diagonal side;

a downward facing ledge side extending from an end of the back diagonal side and from a second end of the vertical back side; and wherein adjacent slat supports are configured to nest such that the downward facing horizontal ledge side, the back diagonal side, and the downward facing horizontal bottom side of one of the adjacent slat supports rests on and directly contacts the upward facing horizontal top side, the front diagonal side, and the upward facing horizontal ledge side, respectively, of the other of the adjacent slat supports;

wherein the front side and the back side each have a height (a) greater than half of the overall height of the slat support and (b) less than the overall height of the slat support; and a second section protruding from a side of the first section, at an angle to a front to back axis of the first section.

* * * * *